United States Patent
Cooke

(10) Patent No.: US 8,910,010 B2
(45) Date of Patent: Dec. 9, 2014

(54) METHOD OF DETECTING TRANSPORTATION NETWORK DATABASE ERRORS AND DEVICES THEREOF

(75) Inventor: Donald Cooke, Redlands, CA (US)

(73) Assignee: TomTom North America, Inc., Lebanon, NH (US)

(*) Notice: Subject to any disclaimer, the term of this patent is extended or adjusted under 35 U.S.C. 154(b) by 330 days.

(21) Appl. No.: 13/388,736

(22) PCT Filed: Jun. 10, 2010

(86) PCT No.: PCT/US2010/038081
§ 371 (c)(1),
(2), (4) Date: Jun. 25, 2012

(87) PCT Pub. No.: WO2011/016901
PCT Pub. Date: Feb. 10, 2011

(65) Prior Publication Data
US 2012/0254707 A1 Oct. 4, 2012

Related U.S. Application Data

(60) Provisional application No. 61/273,185, filed on Sep. 3, 2009.

(51) Int. Cl.
*H03M 13/00* (2006.01)
*G01C 21/32* (2006.01)
*G06F 11/34* (2006.01)
*G06F 11/00* (2006.01)

(52) U.S. Cl.
CPC ............ *G01C 21/32* (2013.01); *G06F 11/3466* (2013.01); *G06F 11/00* (2013.01)
USPC ........... 714/752; 714/786; 714/799; 701/117; 701/412; 701/414; 701/454; 701/474

(58) Field of Classification Search
CPC .................................................. G01C 21/3415
USPC .......... 714/752, 786, 799; 701/117, 412, 414, 701/454, 474
See application file for complete search history.

(56) References Cited

U.S. PATENT DOCUMENTS 6,018,697 A * 1/2000 Morimoto et al. ............ 701/411
6,591,189 B2 * 7/2003 Shimada ....................... 701/428
(Continued)

FOREIGN PATENT DOCUMENTS

EP    0 921 509 A2    6/1999
EP    1 111 340 A2    6/2001
(Continued)

OTHER PUBLICATIONS

International Search Report issued Aug. 5, 2010 for International Application No. PCT/US2010/38081.
(Continued)

*Primary Examiner* — Esaw Abraham

(57) ABSTRACT

A method of detecting errors in road characteristics in a transportation network database includes collecting sequential location measurements from probes traversing between two end points, fitting trace segments having a curved or linear shape between the sequential location measurements collected from the probes to form a probe trace, comparing a position of the probe traces with a position of a calculated path between the two end points, where the calculated path is formed from linked transportation network segments each of the linked transportation segments having a curved or linear shape, where the calculated path follows the road characteristics defined by the attributes associated with the linked transportation segments, and identifying a potential error in the attributes if a probe trace deviating in position from the calculated path is greater than a deviation threshold.

18 Claims, 17 Drawing Sheets

(56) References Cited

U.S. PATENT DOCUMENTS

| | | | |
|---|---|---|---|
| 6,615,135 B2 | 9/2003 | Davies | |
| 6,636,802 B1 * | 10/2003 | Nakano et al. | 701/532 |
| 6,850,841 B1 | 2/2005 | Casino | |
| 7,797,103 B2 * | 9/2010 | Ishigami et al. | 701/417 |
| 7,899,611 B2 * | 3/2011 | Downs et al. | 701/117 |
| 7,912,628 B2 * | 3/2011 | Chapman et al. | 701/117 |
| 7,920,102 B2 * | 4/2011 | Breed | 345/7 |
| 8,054,181 B2 * | 11/2011 | Van Wyck Loomis et al. | 340/539.13 |
| 8,090,524 B2 * | 1/2012 | Chapman et al. | 701/117 |
| 2002/0065603 A1 | 5/2002 | Watanabe et al. | |
| 2005/0102098 A1 | 5/2005 | Montealegre et al. | |
| 2005/0283699 A1 | 12/2005 | Nomura et al. | |
| 2006/0155464 A1 | 7/2006 | Smartt | |
| 2007/0021913 A1 | 1/2007 | Heiniger et al. | |
| 2007/0129892 A1 | 6/2007 | Smartt et al. | |
| 2009/0138188 A1 | 5/2009 | Kores et al. | |

FOREIGN PATENT DOCUMENTS

| | | |
|---|---|---|
| EP | 1 653 196 A1 | 5/2006 |
| GB | 2 428 852 A | 2/2007 |
| WO | 2007074209 A1 | 7/2007 |

OTHER PUBLICATIONS

International Search Report issued Jul. 30, 2010 for International Application No. PCT/EP2009/068050.

* cited by examiner

METHOD OF DETECTING TRANSPORTATION NETWORK DATABASE ERRORS AND DEVICES THEREOF

CROSS-REFERENCE TO RELATED APPLICATION(S)

This application is the National Stage of International Application No. PCT/US2010/38081, filed date 10 Jun. 2010, and designating the United States. The entire contents of this application is incorporated herein by reference. The present application hereby claims priority under 35 U.S.C. §119(e) on U.S. Provisional Patent Application No. 61/273,185 filed 3 Aug. 2009, entitled "Method to Create a Digital Transportation Network", the entire contents of which is hereby incorporated herein by reference.

FIELD

This present application generally relates to identifying attributes associated with a digital transportation network database utilized for vehicle or pedestrian navigation in order to reduce or prevent errors that may cause erroneous routing. For example, the present application identifies map areas where the attributes are incorrect and suggests how to correct the errors using probe data.

BACKGROUND

More and more use is being made of electronic maps, e.g., routing, navigation, finding addresses, and points of interest. New uses are continually appearing. As a consequence of these map uses, the necessity to identify changes in the real world and reflect that change in the electronic map data in a timely fashion becomes more important as these uses advance in technology.

In the past updating mapping data has been a very difficult, time consuming and expensive task, with some items failing to be promptly entered and other items being entered erroneously. For example, road map databases for a country the size of the US are enormous. They represent hundreds of millions of individual facts. Man and nature are continuously changing or adding to those facts. Mapping companies are continuously looking for new methods to find changes, or even an indication of change, so they may more effectively research the issue and update the electronic map.

In recent years, new technologies have come on line including, aerial and satellite photography, terrestrial based imagery from Mobile Mapping Vehicles, GPS and other position determination equipment and their enhancements, GIS platforms and spatial database engines to facilitate making and housing the changes, Lidar, Laser Scanners, radars and, of course, the Internet. These technologies have helped create map updates faster, cheaper, and more accurate, and have also enabled maps to carry new forms of information such as 3D buildings and the like.

Portable navigation devices (PNDs) that include GPS (Global Positioning System) signal reception and processing functionality are well known and are widely employed as in-car or other vehicle navigation systems. Such devices are of great utility when the user is not familiar with the route to the destination to which they are navigating. The wide use of PND's and other navigation devices has increased the availability of data acquisition devices for use in creating map updates.

However, errors in road characteristics defined by one or more attributes associated with road segments are either discovered only by driving to the area in question with a mobile mapping van, by customer report of the error, or by routine quality checks that compare the map database to new source material, such as a local map, air photo, etc.

SUMMARY

Some example embodiments provide a method and apparatus to improve the quality of probe data traces collected by, for example, PND's, other navigation devices, and/or other devices.

According to one example embodiment, a method of detecting errors in road characteristics defined by one or more attributes associated with a transportation network database includes collecting a plurality of sequential location measurements from each of a plurality of probes traversing between two end points. The method also includes fitting trace segments having at least one of a curved and linear shape between the plurality of sequential location measurements collected from each of the of the plurality of probes to form a probe trace for each of the of the plurality of probes. Also, the method includes comparing a position of at least one of the plurality of probe traces with a position of a calculated path between the two end points, where the calculated path is formed from a plurality of linked transportation network segments, each of the linked transportation segments having at least one of a curved or linear shape, where the calculated path follows the road characteristics defined by the one or more attributes associated with the one or more of the linked transportation segments. Further, the method includes identifying a potential error in the one or more attributes if a number of the plurality of probe traces deviating in position from the calculated path is greater than a deviation threshold.

Another example embodiment of the present disclosure is directed to a computer readable medium encoded with computer executable instructions for detecting errors in road characteristics defined by one or more attributes associated with a transportation network database, which when executed on a computer, cause the computer to execute instructions including collecting a plurality of sequential location measurements from each of a plurality of probes traversing between two end points. Further, the computer readable medium fits trace segments having at least one of a curved and linear shape between the plurality of sequential location measurements collected from each of the of the plurality of probes to form a probe trace for each of the of the plurality of probes. The computer readable medium also compares a position of at least one of the plurality of probe traces with a position of a calculated path between the two end points, where the calculated path is formed from a plurality of linked transportation network segments. Each of the linked transportation segments have at least one of a curved or linear shape, where the calculated path follows the road characteristics defined by the one or more attributes associated with the one or more of the linked transportation segments. In addition, the computer readable medium identifies a potential error in the one or more attributes if a number of the plurality of probe traces deviating in position from the calculated path is greater than a deviation threshold.

Another example embodiment of the present disclosure is directed to a server. The server includes a receiver, a processor and a memory. The receiver is configured to collect a plurality of sequential location measurements from each of a plurality of probes traversing between two end points. The processor is configured to fit trace segments having at least one of a curved and linear shape between the plurality of sequential location measurements collected from each of the of the plurality of probes to form a probe trace for each of the of the plurality of probes. The memory is configured to store a plurality of linked transportation network segments, each of the linked transportation segments having at least one of a curved or linear shape. The processor is further configured to compare a position of at least one of the plurality of probe traces with a position of a calculated path between the two end points stored, where the calculated path is formed from the plurality of linked transportation network segments and the calculated path follows the road characteristics defined by the one or more attributes associated with the one or more of the linked transportation segments. The processor is also configured to identify a potential error in the one or more attributes if a number of the plurality of probe traces deviating in position from the calculated path is greater than a deviation threshold.

Advantages of these embodiments are set out hereafter, and further details and features of each of these embodiments are defined in the accompanying dependent claims and elsewhere in the following detailed description.

BRIEF DESCRIPTION OF THE DRAWINGS

Various aspects of the teachings of the present disclosure, and arrangements embodying those teachings, will hereafter be described by way of illustrative example with reference to the accompanying drawings, in which.

DETAILED DESCRIPTION OF EXAMPLE EMBODIMENTS

Figure 1:
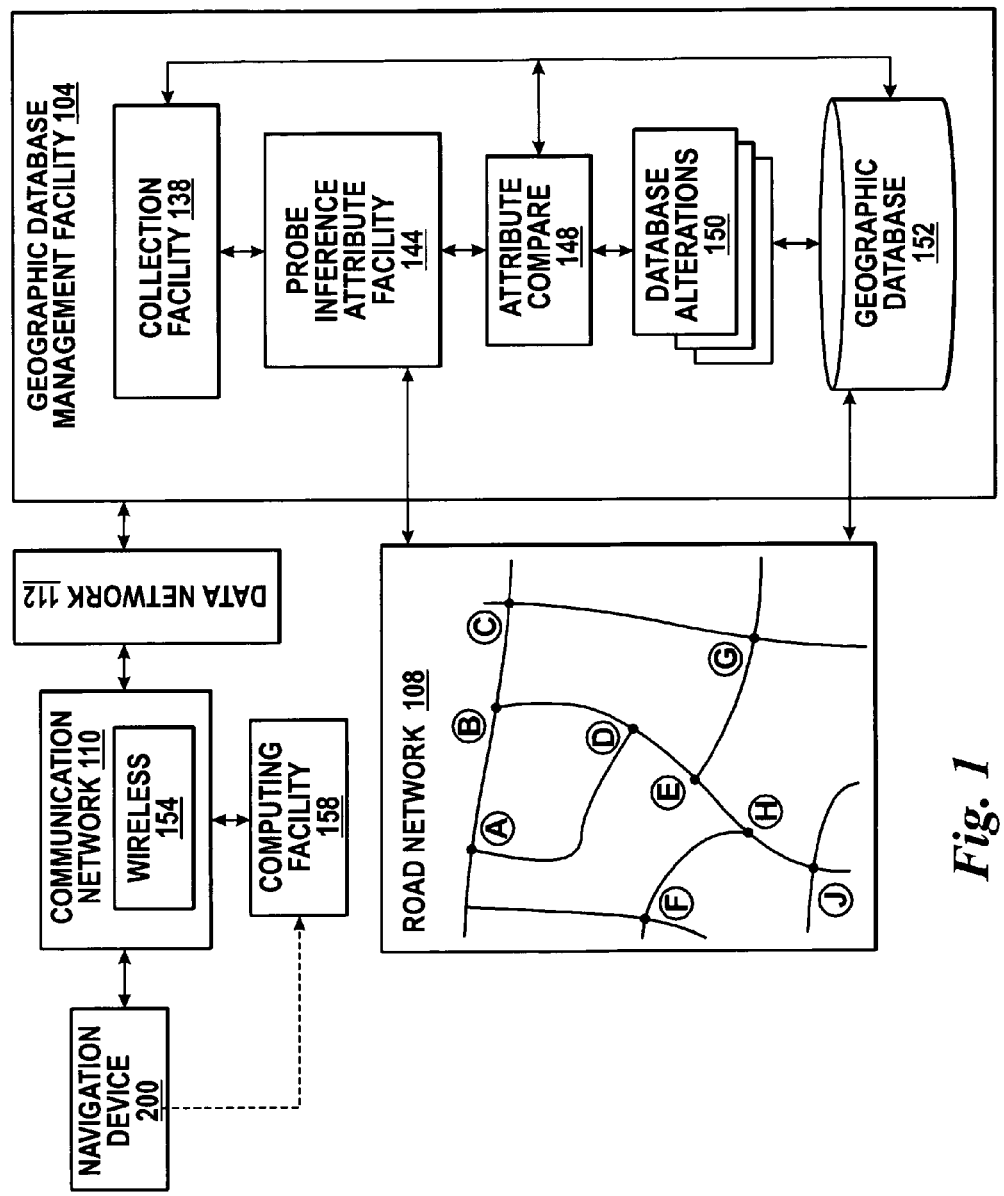
FIG. 1 is an illustration of a block diagram detailing various component parts of a map database update system.

Various example embodiments will now be described more fully with reference to the accompanying drawings in which some example embodiments are illustrated.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Spatially relative terms, e.g., "beneath," "below," "lower," "above," "upper" and the like, may be used herein for ease of description to describe one element or a relationship between a feature and another element or feature as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, for example, the term "below" can encompass both an orientation which is above as well as below. The device may be otherwise oriented (rotated 90 degrees or viewed or referenced at other orientations) and the spatially relative descriptors used herein should be interpreted accordingly.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It is convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes include routines, programs, objects, components, data structures, that perform particular tasks or implement particular abstract data types and may be implemented using existing hardware at existing network elements or control nodes (e.g., a database). Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of example embodiments are typically encoded on some form of computer readable medium or implemented over some type of transmission medium. The computer readable medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. Example embodiments are not limited by these aspects of any given implementation.

Example embodiments of the present disclosure may be described with particular reference to a geographic database. It should be remembered, however, that the teachings of the present disclosure are not limited to any particular form of database but are instead universally applicable to any type of database and/or any processing device that is configured to execute a program to access data in a data structure, the data being associated with mapping data, but not exclusively mapping data. It follows therefore that in the context of the present application, a geographic database is intended to include any database accessible to a server, computer or computing device configured for accessing data, generating new maps and/or updating maps based on the accessed data.

Example embodiments of the present disclosure may be described with particular reference to a personal navigation device (PND). It should be remembered, however, that the teachings of the present disclosure are not limited to PNDs but are instead universally applicable to any type of processing device that is configured to execute navigation software so as to provide route planning and navigation functionality. It follows therefore that in the context of the present application, a navigation device is intended to include (without limitation) any type of route planning and navigation device, irrespective of whether that device is embodied as a PND, a navigation device built into a vehicle, or indeed a computing resource (such as a desktop or portable personal computer (PC), mobile telephone or portable digital assistant (PDA)) executing route planning and navigation software. In addition to street networks, the example embodiments may be implemented in pedestrian navigation networks and any other type of transportation network (e.g., a metro train).

Segments in these networks, for example a portion of a road and/or sidewalk are often referred to as navigable features. Boundaries of these segments, for example centrelines, shoulder lines and stop signs may be referred to as geometric features. Navigable and geometric features are not limited in any way to the aforementioned examples.

Moreover, while example embodiments described below utilize GPS measurements (trace points) including latitude and longitude coordinates as location measurements, it should be understood that location measurements may be obtained from any source and are not limited to GPS.

While location measurements in the example embodiments described below operate in two dimensions, it should be understood that a person of ordinary skill in the art will be able to implement the discussed example embodiments in three or more dimensions.

It will also be apparent from the following description that the teachings of the present disclosure even have utility in circumstances where a user is not seeking instructions on how to navigate from one point to another, but merely wishes to be provided with a view of a given location.

FIG. 1 is an illustration of a block diagram detailing various component parts of a map database system. Referring to FIG. 1, a navigational device 200 may be provided with communication facilities through a communication network 110 and data network 112 to a geographic database management facility 104. The communication network 110 may be a wireless communications network 154 through a service provider, such as provided through a cellular network; a wireless communications network 154 through an area network, such as provided through a Wi-Fi hot spot or WiMAX; a wired connection to a computing facility 158, such as provided to a home personal computer; and the like.

In example embodiments, the data network 112 connected between the communications network 110 and the geographic database management facility 104 may be, for example, a local area network (LAN), personal area network (PAN), campus area network (CAN), Metropolitan area network (MAN), wide area network (WAN), global area network (GAN), internetwork, intranet, extranet and/or the internet.

The communication network 110 is not limited to a particular communication technology. Additionally, the communication network 110 is not limited to a single communication technology; that is, the network 110 may include several communication links that use a variety of technology. For example, the communication network 110 may be adapted to provide a path for electrical, optical, and/or electromagnetic communications. As such, the communication network 110 may include, but is not limited to, one or a combination of the following: electric circuits, electrical conductors such as wires and coaxial cables, fibre optic cables, converters, radio-frequency (RF) waves, the atmosphere, empty space, etc. Furthermore, the communication network 110 may include one or more intermediate devices such as routers, repeaters, buffers, transmitters, and receivers, for example.

In one illustrative arrangement, the communication network 110 may include telephone and computer networks. Furthermore, the communication network 110 may be capable of accommodating wireless communication, for example radio frequency, microwave frequency and/or infrared communication. Additionally, the communication network 110 may accommodate satellite communication.

The communication signals transmitted through the communication network 110 may include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), and Global System for Mobile Communications (GSM). Both digital and analogue signals may be transmitted through the communication network 110. These signals may be modulated, encrypted and/or compressed signals as may be desirable for the communication technology.

The geographic database management facility 104 may include a collection facility 138 that may collect road characteristic 122 and/or probe data from a plurality of navigation devices 200, or other non-navigation probe devices, e.g., truck monitoring systems for collection of probe data. The collected road characteristic 122 and/or probe data may be used to determine where vehicles or pedestrians using the navigation devices 200 are following a calculated route. This data can be used to identify incorrect attributes associated with the calculated route and even indicate what a proper value of the attribute should be, as explained in further detail below.

The probe data may include sequential location measurements such as GPS trace points. The GPS trace points identify latitude and longitude coordinates as well as heading, velocity and slope. The location measurements may be acquired periodically (e.g., every 5 seconds) by the navigation device 200.

The probe data may then be provided to a probe inference attribute facility 144 where road segment attributes may be inferred from the collected probe data. Probe inference attributes may then be compared at an attribute compare 148 with the attributes stored in the geographic database 152, where differences may be detected and interpreted, and where notifications may be generated for possible generation of geographic database alterations 150. Possible database alterations include, but are not limited to, generating new maps based on the acquired probe data. Ultimately, database alterations 150 may be provided to the geographic database 152 and on to users as a part of an update facility to a local geographic database, for example, the navigation device 200.

Example embodiments make use of vehicles as probes, where the vehicles may be equipped with sensors that collect information such as position, speed, heading, slope, time, and the like, that may be used to infer the changing conditions of a road network 108 over time. In example embodiments, a system may collect data from a plurality of vehicles that are traversing a road network 108 over a first period of time (via the collected data being accumulated by a PND or other device within the vehicle, for example, and then transmitted to a remote server), and then compare this data to a plurality of vehicles traversing the same road network 108 over a second period of time.

The comparison may also be between the first set of data and data associated with the same road network which is stored in geographic database 152. By comparing these two sets of data, changes in travel patterns may be used to infer a change in road conditions and/or road routings. For example, if in the first time period drivers travel both North and South over the same or a closely similar locus of points (likely a road), and in the second period of time travel only North for the same locus of points, it may be inferred that a significant change has been made to the direction of travel allowed on the road that represents this collection of data, and that the road has been made a one-way road. In another example embodiment, the comparing may be omitted by generating a new map based on the collected probe data for the segment.

Similarly, if most vehicles merely slow before proceeding through a specific intersection in a first period of time, but in a second period of time all come to a full stop, it may be inferred that a new stop sign has been placed at the intersection. By tracking the vehicles over time, a geographic database provider may be provided a timelier indicator of changes in the road network 108, which may lead to more timely changes in the geographic database 152 and/or a new geographic database 152. These changes may then lead to user updates and or new maps that better reflect the current state of a road network 108. The above changes to the roads may be carried out by changing a value of one or more attributes associated with segments of the roads, as explained in further detail below.

Figure 2:
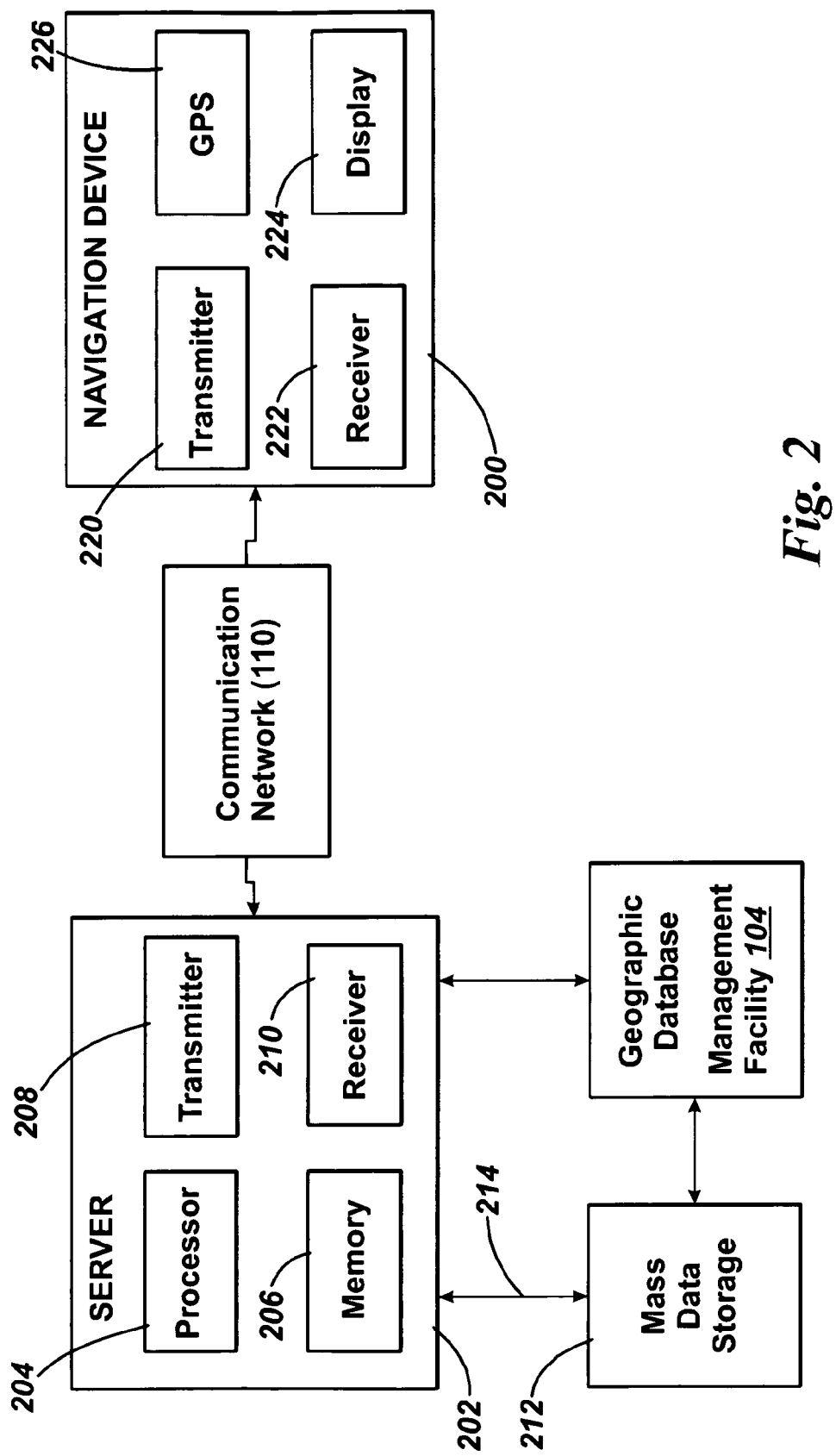
FIG. 2 is a schematic illustration of the manner in which a navigation device may receive or transmit information over a wireless communication channel.

Referring now to FIG. 2, the navigation device 200 may establish a "mobile" or telecommunications network connection with a server 202 via a mobile device (not shown) (e.g., a mobile phone, PDA, and/or any device with mobile phone technology) establishing a digital connection (e.g., a digital connection via known Bluetooth technology for example). Thereafter, through a network service provider, the mobile device can establish a network connection (through the internet for example) with a server 202. As such, a "mobile" network connection is established between the navigation device 200 (which can be, and often times is mobile as it travels alone and/or in a vehicle) and the server 202 to provide a "real-time" or at least very "up to date" gateway for information via communication network 110.

The establishing of the network connection between the mobile device (via a service provider) and another device such as the server 202, using an internet (such as the World Wide Web) for example, may be done in a known manner. This may include use of TCP/IP layered protocol for example. The mobile device may utilize any number of communication standards, for example CDMA, GSM, WAN.

As such, an internet connection may be utilised which is achieved via a data connection, via a mobile phone or mobile phone technology within the navigation device 200 for example. For this connection, an internet connection between the server 202 and the navigation device 200 is established. This may be done, for example, through a mobile phone or other mobile device and a GPRS (General Packet Radio Service)-connection (GPRS connection is a high-speed data connection for mobile devices provided by telecom operators; GPRS is a method to connect to the internet).

The navigation device 200 may further complete a data connection with the mobile device, and eventually with the internet and server 202, via existing Bluetooth technology for example, in a known manner, wherein the data protocol may utilize any number of standards, for example the GSRM or the Data Protocol Standard for the GSM standard.

The navigation device 200 may include mobile phone technology within the navigation device 200 itself (including an antenna for example, or optionally using the internal antenna of the navigation device 200). The mobile phone technology within the navigation device 200 may include internal components as specified above, and/or may include an insertable card (e.g., Subscriber Identity Module or SIM card), complete with necessary mobile phone technology and/or an antenna for example. As such, mobile phone technology within the navigation device 200 may similarly establish a network connection between the navigation device 200 and the server 202, via the internet for example, in a manner similar to that of any mobile device.

For GPRS phone settings, a Bluetooth enabled navigation device may be used to correctly work with the ever changing spectrum of mobile phone models, manufacturers, etc., model/manufacturer specific settings may be stored on the navigation device 200 for example. The data stored for this information may be updated.

In FIG. 2 the navigation device 200 is depicted as being in communication with the server 202 via a generic communication network 110 that may be implemented by any of a number of known arrangements.

The server 202 includes an input device, for example a receiver 210 that is configured to receive sequential location measurements (e.g., GPS trace points). The server 202 further includes a processor 204 configured to determine a baseline based on the sequential location measurements along the at least one navigable feature, sort and cluster the sequential location measurements into a plurality of location measurement groups that are along the baseline, determine a normal distribution for each of the plurality of location measurement groups based on the sequential location measurements, and determine a geometric feature of the at least one navigable feature based on the normal distributions. In an example embodiment, the server is 202 configured to implement the method illustrated in FIG. 4, which will be described below.

The server 202 and a navigation device 200 may communicate when a connection via communication network 110 is established between the server 202 and the navigation device 200 (noting that such a connection may be a data connection via mobile device, a direct connection via personal computer and/or via the internet).

The server 202 includes, in addition to other components which may not be illustrated, a processor 204 operatively connected to a memory 206 and further operatively connected, via a wired or wireless connection 214, to a mass data storage device 212. The processor 204 may be further operatively connected to a transmitter 208 and a receiver 210, to transmit and send information to and from the navigation device 200 via the communication network 110. The signals sent and received may include, for example, data, communication, and/or other propagated signals. The transmitter 208 and the receiver 210 may be selected or designed according to the communications requirement and communication technology used in the communication design for the navigation system 200. Further, it should be noted that the functions of the transmitter 208 and the receiver 210 may be combined into a signal transceiver.

The server 202 is further connected to (or includes) a mass storage device 212, noting that the mass storage device 212 may be coupled to the server 202 via communication link 214. The mass storage device 212 may contain a store of navigation data and map information, and may be a separate device from the server 202 or may be incorporated into the server 202.

The server 202 is further connected to (or includes) the geographic database management facility 104 as described above with regard to FIG. 1. For example, the collection facility 138 may be code segments stored in memory 206 and executed by the processor 204. The mass storage device 212 may also be connected to or be part of the geographic database management facility 104. For example, the geographic database 152 may be a data structure stored on mass storage device 212.

The navigation device 200 may be adapted to communicate with the server 202 through the communication network 110, and may include at least a processor and a memory as described in more detail below with regard to FIG. 9, as well as a transmitter 220 and a receiver 222 to send and receive signals and/or data through the communication network 110, noting that these devices may further be used to communicate with devices other than server 202. Further, the transmitter 220 and the receiver 222 are selected or designed according to communication requirements and communication technology used in the communication design for the navigation device 200 and the functions of the transmitter 220 and receiver 222 may be combined into a single transceiver.

Software stored in server memory 206 provides instructions for the processor 204 and allows the server 202 to provide services to the navigation device 200. One service provided by the server 202 may involve, for example, processing requests from the navigation device 200 and transmitting navigation data from the mass data storage 212 to the navigation device 200. Another service provided by the server 202 may include, for example, processing the navigation data using various algorithms for a desired application and sending the results of these calculations to the navigation device 200.

The communication network 110 generically represents the propagating medium or path that connects the navigation device 200 and the server 202. Both the server 202 and the navigation device 200 include a transmitter for transmitting data through the communication channel and a receiver for receiving data that has been transmitted through the communication channel.

The server 202 may include a remote server accessible by the navigation device 200 via a wireless channel. The server 202 may include a network server located on, for example, a local area network (LAN), wide area network (WAN) and/or virtual private network (VPN).

The server 202 may include a personal computer such as a desktop or a laptop computer, and the communication network 110 may be a cable connected between the personal computer and the navigation device 200. Alternatively, a personal computer may be connected between the navigation device 200 and the server 202 to establish an internet connection between the server 202 and the navigation device 200. Alternatively, a mobile telephone or other handheld device may establish a wireless connection to the internet, for connecting the navigation device 200 to the server 202 via the internet.

The navigation device 200 may be provided with information from the server 202 via information downloads which may be periodically updated automatically or upon a user connecting navigation device 200 to the server 202 and/or may be more dynamic upon a more constant or frequent connection being made between the server 202 and navigation device 200 via a wireless mobile connection device and TCP/IP connection for example. For many dynamic calculations, the processor 204 in the server 202 may be used to handle the bulk of the processing needs, however, processor 210 of navigation device 200 may also handle much processing and calculation, oftentimes independent of a connection to server 202.

The navigation device 200 may also provide information to server 202. For example, navigation device 200 may include hardware and/or software (described in more detail below with regard to FIG. 9) configured to provide probe data to the geographic database management facility 104 via, for example, communication network 110 and server 202.

Figure 3A:
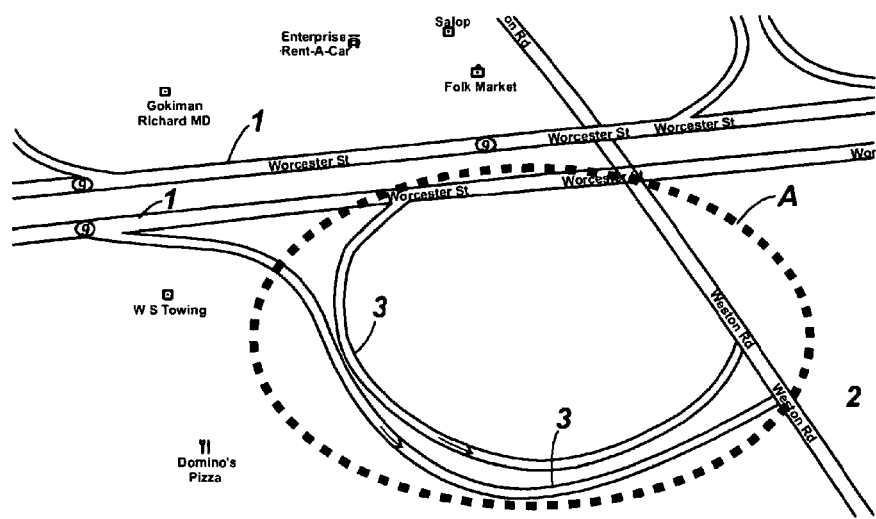
FIG. 3A illustrates an example of an error in a road characteristic defined by one or more attributes associated with a digitally mapped road network of a database.
Figure 3B:
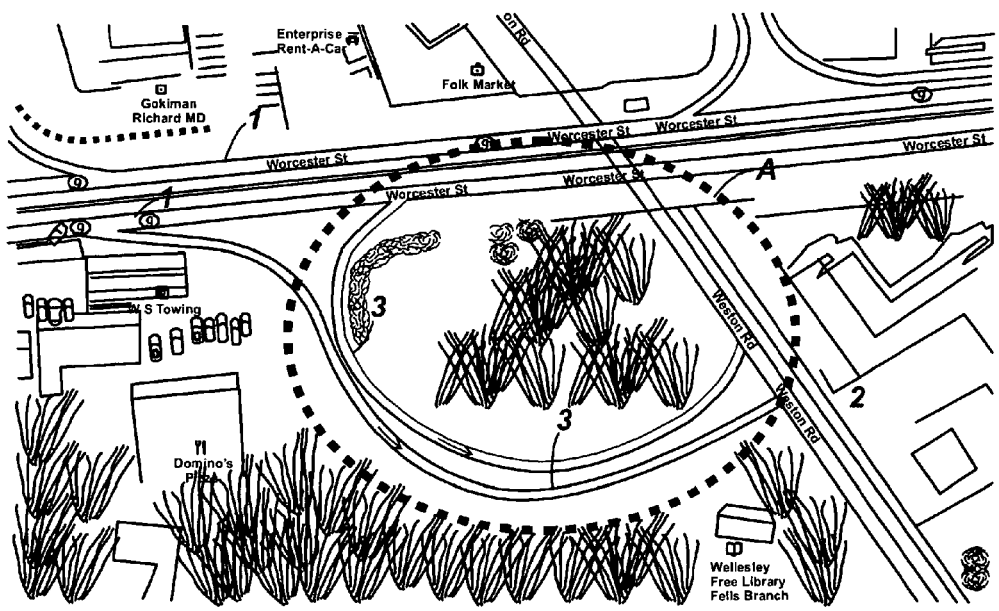
FIG. 3B illustrates an aerial image of the road network shown in FIG. 3A.

FIG. 3A illustrates an example of an error in a road characteristic defined by one or more attributes associated with a digitally mapped road network of a database. FIG. 3B illustrates an aerial image of the road network shown in FIG. 3A.

The poly-line representations shown in FIG. 3A and stored in the database are representations of actual roads. The database may, for example, be included in or part of one of the server 202, the mass data storage 212, the memory 206 and the geographic database management facility 104. FIG. 3A shows an intersection between a first road 1 and a second road 2, where the first road 1 traverses a vertical diagonal path in from a centre of FIG. 3A to a lower right of FIG. 3A and the second road 2 traverses a horizontal path that passes over the first road 1 without directly intersecting the path of the first road 1. A third road 3, which enclosed by the dotted circle A, is shown to traverse a path that connects the first road 1 and the second road 2. As shown by a direction of arrows along the third road 3, attributes in the database have defined the third road 3 to have two one-way ramps both only allowing travel in a direction from the first road 1 the second road 2.

However, as shown in the aerial image of FIG. 3B and clarified by a direction of the arrows within the area A, the two ramps of the second road 2 actually travel in opposite directions: one of the ramps of the third road 3 traverses from the first road 1 eastbound to the second road 2 southbound, and an other of the ramps of the third road 3 traverses from the second road 2 southbound to the first road 1 eastbound. Therefore, the attributes in the database representing a direction of travel for the third road 3 have been coded to incorrectly represent two one-way ramps, as shown in FIG. 3A.

FIG. 4 illustrates a method S100 for of detecting errors in road characteristics defined by one or more attributes associated with a database, according to an example embodiment of the present application.

At S110, the server 202 collects a plurality of sequential location measurements from each of a plurality of probes traversing between two end points. The two end points represent an origin and a destination of the probes. As explained above, the probes may be navigation devices 200 located within, for example, vehicles traversing a route between the two end points. The plurality of sequential location measurements may, for example, be transmitted by a transmitter 220 of the navigation device 200 and collected by the receiver 210 of the server 202.

The server 202 may collect the sequential location measurements at S110 either automatically at different time intervals and/or manually by prompting a user of the navigation device 200 for input.

At S120, the server 202 fits trace segments having at least one of a curved and linear shape between the plurality of sequential location measurements collected from each of the of the plurality of probes to form a probe trace for each of the of the plurality of probes. For example, the server 202 may fit the trace segments to have at least one of a curved and linear shape based on a geometry of a group of the sequential location measurements, where at least the curved trace segment is represented by a function. The fitting of the trace segments may be carried out by any algorithm and/or function known in the art for fitting a line to the sequential location measurements. Storing the group of sequential location measurements as a line segment instead of individually storing the group of points may save storage space in the server 202. Probe traces are shown in further detail with respect to FIGS. 6 and 7 below.

At S130, the server 202 compares a position of at least one of the plurality of probe traces with a position of a calculated path between the two end points. Alternatively, for S130, a position of a mean of the plurality of probe traces may be determined and compared to the position of the calculated route. The calculated path is formed from a plurality of linked transportation network segments stored in the database. Each of the linked transportation segments have at least one of a curved or linear shape, where the calculated path follows the road characteristics defined by the one or more attributes associated with the one or more of the linked transportation segments. The calculated path defines an optimal or improved route prescribed by either the server 202 or the navigation 200 for the user to follow in order to traverse a path between the two end points. The calculated path is based on previously collected and analyzed data, such as the transportation segments and associated attributes stored in the server 202. An example embodiment of step S130 is explained in greater detail with respect to FIG. 4B.

At S140, the server 202 determines if a number of the plurality of probe traces deviating in position from the calculated path is greater than a deviation threshold. The deviation threshold may be determined empirically or based on specifications. For example, the deviation threshold may be set so that the deviation threshold is only exceeded if a certain percentage (e.g. 75%) and/or number (e.g. 500 per day) of the plurality of probe traces deviates in position from the calculated path. Thus, if the deviation threshold is exceeded, the reason for the deviations in position of the plurality of probe traces is likely to be due a potential error in the one or more attributes, as opposed to a superfluous reason, such as users willingly deviating to less optimal paths or different paths altogether.

Hence, if the number is greater than the deviation threshold, the server 202 identifies a potential error in the one or more attributes at S150. Otherwise, the server 202 determines that the one or more attributes is verified to be correct at S160.

In addition, at S150, the server 202 may also further identify potential errors in one or more attributes associated with one or more linked transportation segments in the database separate from the calculated path that correspond to a position of the deviating probe traces at the one or more intervals. For example, if the server 202 determines that the identified potential error in the one or more attributes is associated with a linked transportation segment stored in the database that is not part of the calculated route, the server 202 may still identify this potential error so that a potential error can be detected and/or corrected beforehand for a future calculated route using this linked transportation segment.

Following S160, if potential errors are identified, the server 202 may optionally also update the corresponding one or more attributes by changing a value of the one or more attributes. The value of the one or more attributes may indicate between one of allowed and prohibited road characteristics.

While an example of the one or more attributes have been shown to relate to road characteristic involving a direction of travel on a one-way road, example embodiments of the present application are not limited thereto. For example, the one or more attributes may relate to road characteristics such as geographic indicators and/or traffic controls. Geographic indicators may relate to presence or absence of road lanes, number of road lanes, type of road lanes, blocked passages, grade-separated crossings, elevation, road gradients, and the like. Traffic controls may relate to legal speed limits, stop signs, yields, school zones, turn restrictions, lane change capability, direction of road lanes, and the like. A value of the attributes may also be configured to be variable according to a time of day. For example, left turns may be prohibited during rush-hour time periods but otherwise allowed.

Figure 4A:
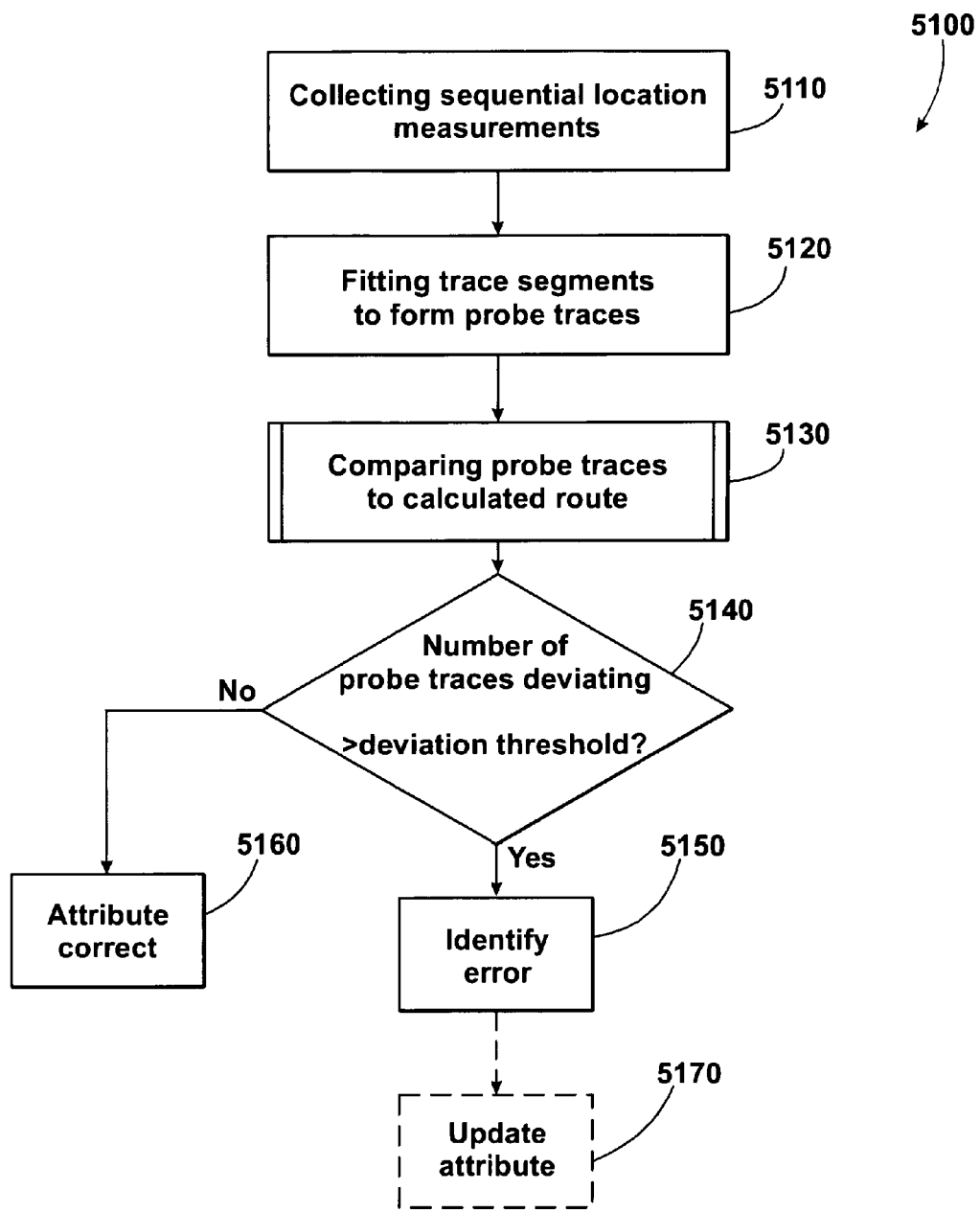
FIG. 4A illustrates a method for of detecting errors in road characteristics defined by one or more attributes associated with a database, according to an example embodiment of the present application.
Figure 4B:
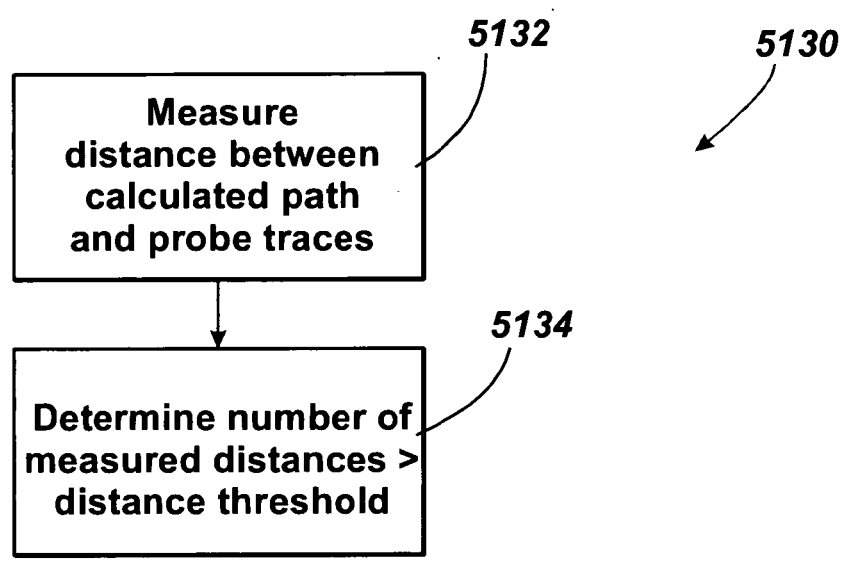
FIG. 4B illustrates an example of S130 shown in FIG. 4A.

FIG. 4B illustrates an example of S130 shown in FIG. 4B. At S132, the server 202, measures a distance between the calculated path and at least one of the plurality of probe traces at one or more intervals between the two end points of the calculated path. For example, the server 202 may measure the distance at the one or more intervals by measuring the distance at which a perpendicular bisector at the one or more intervals intersects at least one of the plurality of probe traces. The measuring of the distance between the calculated path and the at least one plurality of probe traces may also be carried out by any algorithm and/or function known in the art for measuring such distances. The one or more intervals may or may not correspond to the plurality of linked transportation network segments.

At S134, the server 202 determines a number of the measured distances that is greater than a distance threshold for each of the one or more intervals. The distance threshold may be determined empirically or based on specifications. For example, if the measured distance for one of the probe traces is greater than the distance threshold (e.g. 20 meters), then it may be inferred that this probe trace follows a different path for than that prescribed by the calculated route for the one or more intervals.

Returning to FIG. 4A, at step S140, the server 202 determines whether a number of the measured distances at the corresponding one or more intervals is greater than the deviation threshold. If the number of measured distances that is greater than distance threshold at the corresponding one or more intervals is greater than the deviation threshold, the server 202 identifies the potential error in the one or more attributes associated with one or more of the linked transportation segments corresponding to the one or more intervals at S150. Otherwise, the server 202 determines that the one or more attributes associated with one or more of the linked transportation segments corresponding to the one or more intervals is verified to be correct at S160.

At optional S170, the server 202 may also update the one or more attributes identified to have the potential error and associated with one or more of the linked transportation segments corresponding to the one or more intervals by changing a value of the one or more attributes as described above.

Any of the above steps S110-S160, may be performed, in conjunction with the processor 204 and/or the memory 206 of the server 202. Further, while the server 202 is shown to carry out the above steps, the method according to an example embodiment of the present application may also be carried out by another component of the map database update system, such as the navigation device 200.

The above steps S110-S160 shown in FIGS. 4A and 4B may carried out simultaneously for a plurality of the attributes and/or a plurality of the intervals. Alternatively, the above steps S110-S160 shown in FIGS. 4A and 4B may carried out sequentially for one or more of the attributes and/or one or more of the intervals until all of the desired attributes and/or intervals have been examined.

For example, it may be desired to examine only the attributes associated with a maneuver of the calculated route from the first road 1 to the second road 2 in FIG. 3A. For purposes of this discussion, a maneuver may be defined as a path taken for part of the plurality of the linked transportation segments of the calculated route between the two end points in the database.

Maneuvers may be as simple as a right or left turn at an intersection or more complicated, such as an interchange involving various ramps and/or access roads. Types of interchanges may include basketweave, diamonds, roundabouts, parclo, directional T, full Y, trumpet, Turbine, cloverstack, Cloverleaf and the like.

As explained above, the value of an attribute may indicate whether an action is allowed or prohibited at an interval or transportation segment. For example, for an attribute regarding a left-turn at an intersection, one value of the attribute would indicate a left turn is allowed while another value of the attribute would indicate that a left turn is prohibited.

Figure 5:
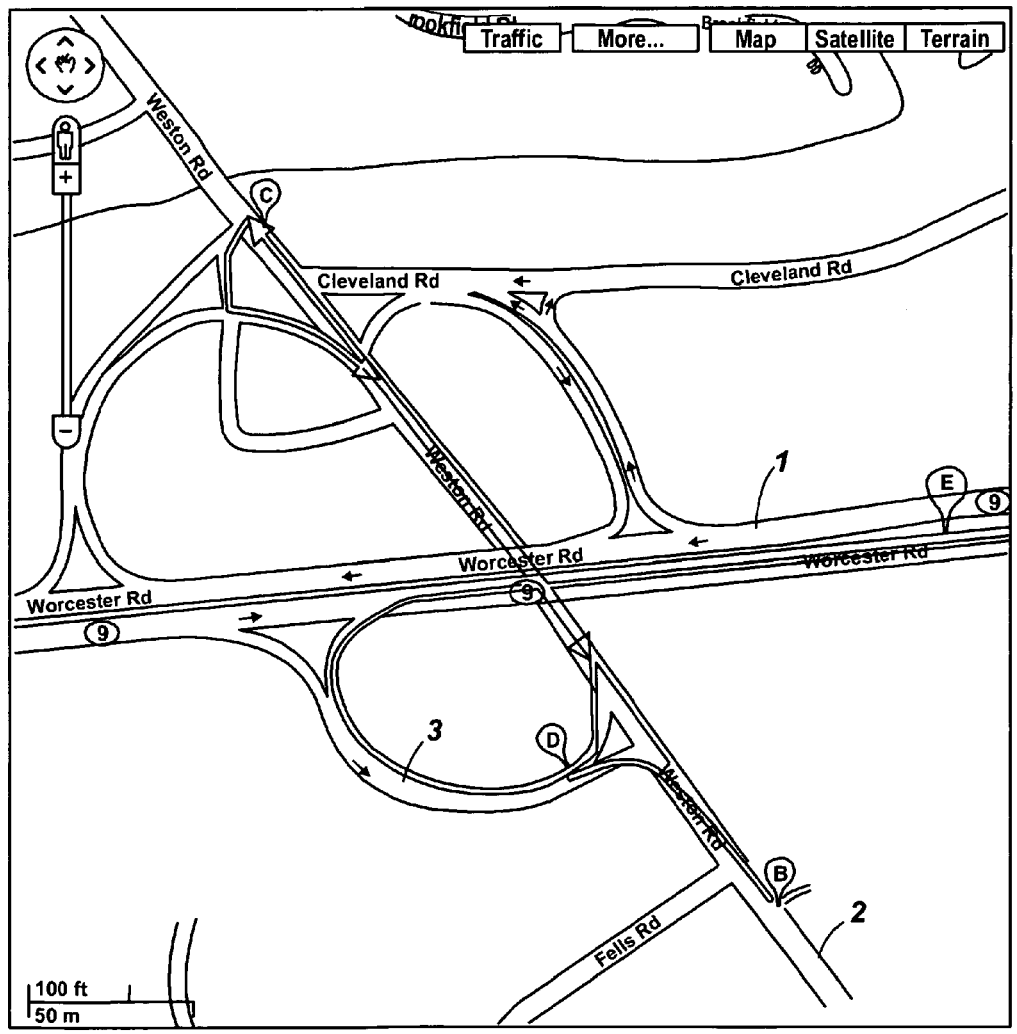
FIG. 5 illustrates a result of correcting the error in the road characteristic shown in FIG. 3A, according to an example embodiment of the present application.

FIG. 5 illustrates a result of correcting the error in the road characteristic shown in FIG. 3A, according to an example embodiment of the present application. In FIG. 5, two maneuvers between the points B and E are shown in the digitally mapped road network of the database previously illustrated in FIG. 3A.

A first maneuver follows the points B through E in succession, where a U-turn is made (possibly illegally) at point C. A second maneuver follows the points B, D and E in succession, where a simple left turn is made at point D between points B and E. As can be clearly seen in FIG. 5, the first maneuver is far more complicated than the second maneuver. If the errors in the road characteristics associated with one or more of the attributes shown in FIG. 3A for the third road 3 are not corrected, a user would be advised to by the navigation device 200 to follow the first maneuver. This is because the road characteristics related to the one or more attributes associated with the transportation segments of the third road 3 in FIG. 3A would incorrectly indicate that both one-way streets of the third road 3 traverse from the first road 1 to the second road 2. As a result, one or more attributes may also be set to incorrectly indicate that a left turn onto the third road 3 is prohibited for northbound traffic on the second road 2.

However, the road characteristics related to the one or more attributes associated with the transportation segments of the third road 3 in FIG. 3A may be corrected according to the method of an example embodiment of the present application to indicate that one of the one-way streets of the third road 3 traverses from the second road 2 to the first road 1. Thus, one or more attributes may also be set to correctly indicate that a left turn onto the third road 3 is allowed for northbound traffic on the second road 2. As a result, a user would be advised by the navigation device 200 to follow the optimal or improved second maneuver when traversing between points B and E.

The corrected result in FIG. 5 occurs by detecting errors in the one or more attributes based on statistical analysis of probe traces that deviate from the calculated route suggested by the navigation device 200, according to an example embodiment of the present application. Thus, if a significant number of vehicles do not follow the calculated route, the method according to an example embodiment of the present application may infer than an incorrect or sub-optimal route is being calculated for the user to follow, due to an error in the one or more attributes, as explained above.

Figure 6:
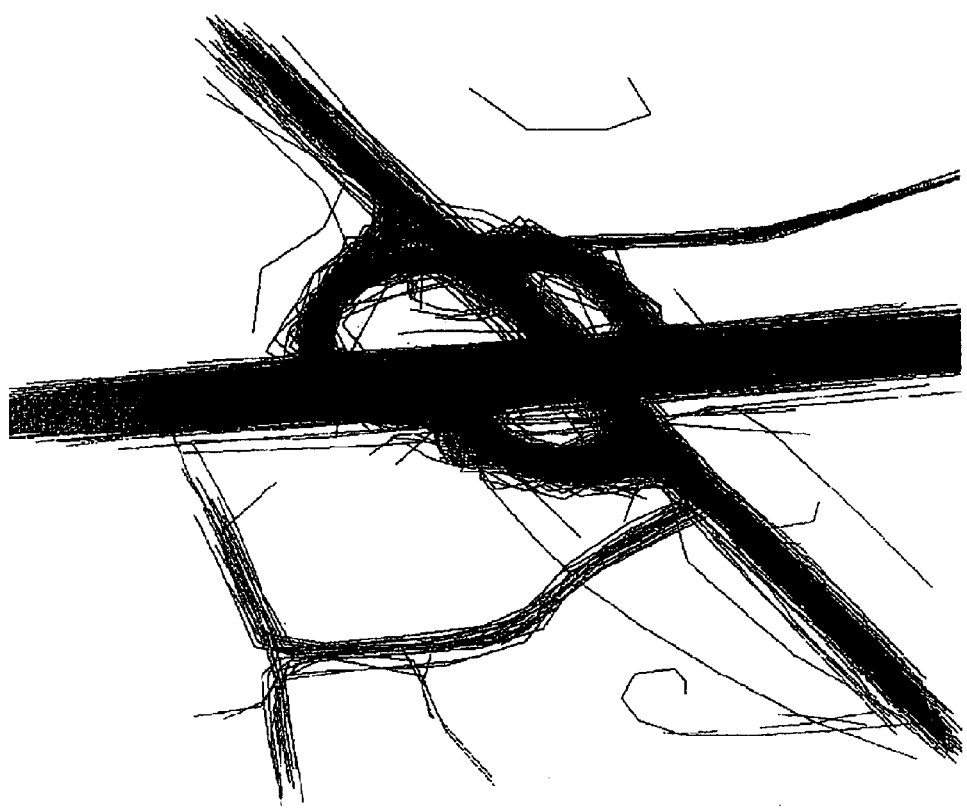
FIG. 6 illustrates a plurality of probe traces traversing an intersection shown in FIG. 5.
Figure 7:
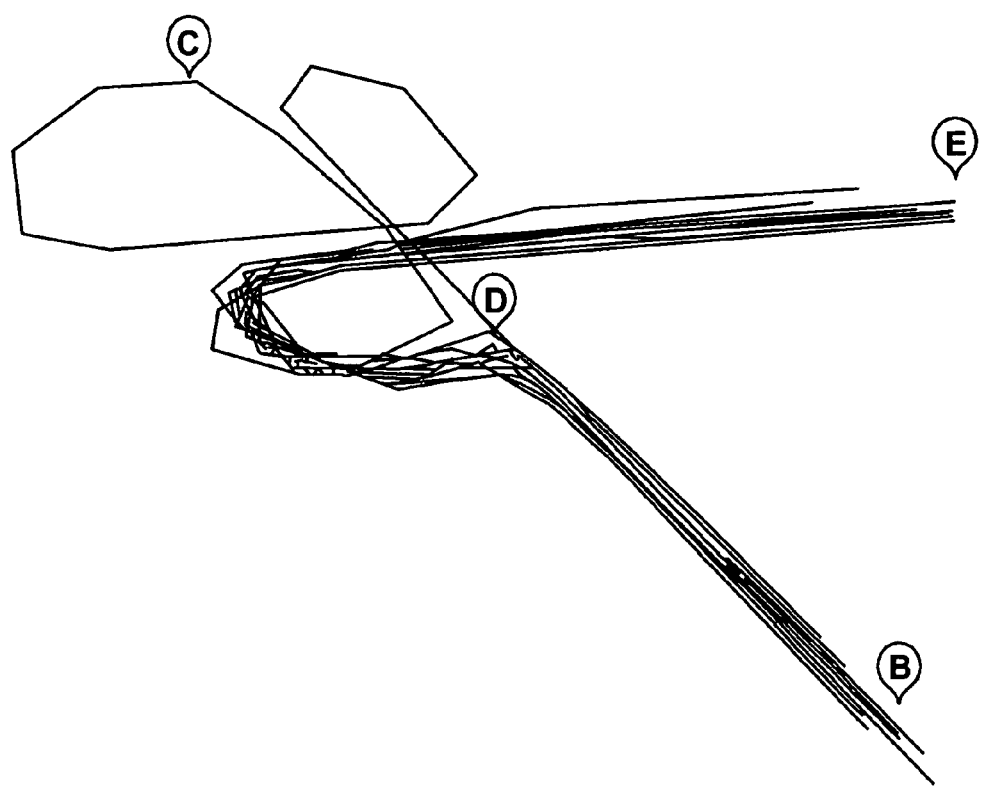
FIG. 7 illustrates a plurality of probe traces traversing between points B and E of FIG. 5.

FIG. 6 illustrates a plurality of probe traces traversing an intersection shown in FIG. 5. FIG. 7 illustrates a plurality of probe traces traversing between points B and E of FIG. 5.

FIG. 6 shows several thousand probe traces that traverse the first, second and third roads 1-3 of FIG. 5 while FIG. 7 shows only those traces from the several thousand probe traces that traverse from point B to point E of FIG. 5. FIG. 7 clearly shows that a vast majority of the vehicles followed the shorter second maneuver while only one vehicle followed the complicated first maneuver. Therefore, according to the method of the example embodiment of the present application, if the calculated route prescribed the first maneuver, errors in attributes related to a left turn and associated with transportation segments surrounding point D would be at least one of identified and updated.

According to an example embodiment of the present application, when the navigation device 200 plans a calculated route and the calculated route is not followed, then this information may be stored in the memory of the navigation device 200 and at a later point in time, uploaded to the server 202. In this scenario, the probe traces are then analyzed at these locations to determine if an error exists in the one or more attributes, and the error is either automatically corrected or an editor is alerted for a manual update.

Example embodiments of the present application are not limited to the attributes described above and may include a variety of other attributes not associated with maneuvers, such as traffic speeds.

An example embodiment of the present application is directed to computer software for determining an error in road characteristics defined by one or more attributes associated with a transportation network database.

Example embodiments may be implemented as a computer program product for use with a computer system, the computer program product being, for example, a series of computer instructions or program segments stored on a tangible data recording medium (computer readable medium), such as a diskette, CD-ROM, ROM, or fixed disk, or embodied in a computer data signal, the signal being transmitted over a tangible medium or a wireless medium, for example, microwave or infrared. The series of computer instructions or program segments can constitute all or part of the functionality of the method of embodiments described above, and can also be stored in any memory device, volatile or non-volatile, such as semiconductor, magnetic, optical or other memory device.

An example embodiment of the present application is directed to a server for detecting errors in road characteristics defined by one or more attributes associated with a transportation network database.

The server may be, for example, server 202 as described above with regard to FIG. 2.

Figure 8:
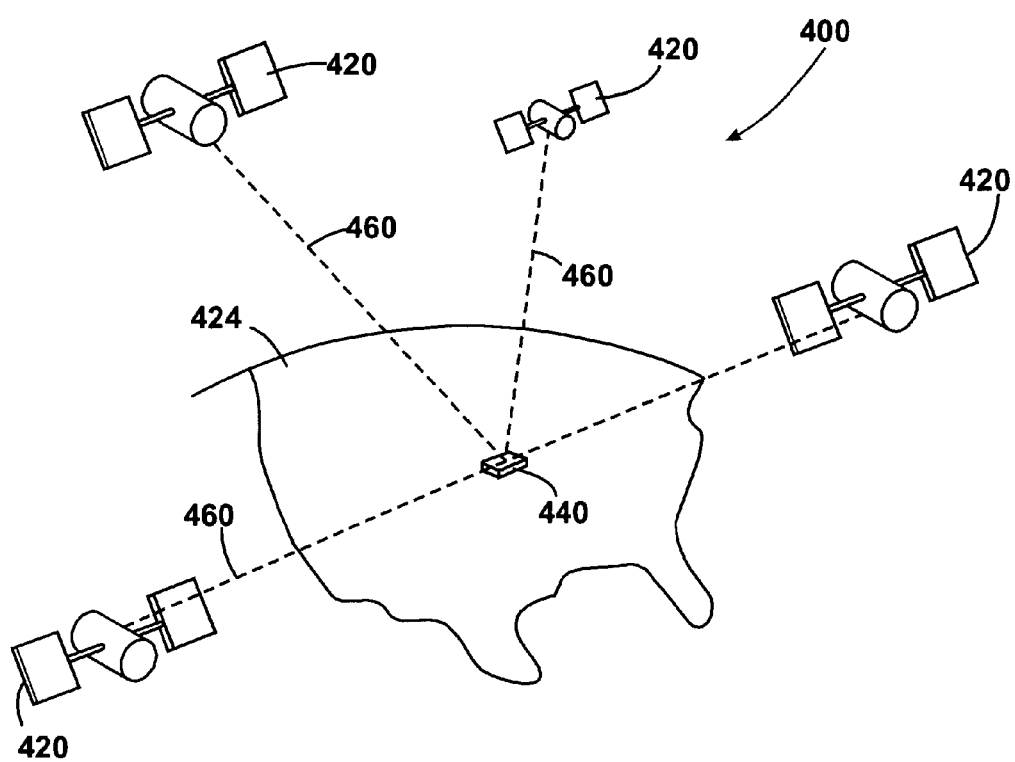
FIG. 8 is a schematic illustration of a Global Positioning System (GPS)

FIG. 8 illustrates an example view of Global Positioning System (GPS), usable by navigation devices. Such systems are known and are used for a variety of purposes. In general, GPS is a satellite-radio based navigation system capable of determining continuous position, velocity, time, and in some instances direction information for an unlimited number of users. Formerly known as NAVSTAR, the GPS incorporates a plurality of satellites which orbit the earth in extremely precise orbits. Based on these precise orbits, GPS satellites can relay their location to any number of receiving units.

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal will allow the receiving device to calculate its three dimensional position by the same geometrical calculation in a known manner. The position and velocity data can be updated in real time on a continuous basis by an unlimited number of users.

As shown in FIG. 8, the GPS system is denoted generally by reference numeral 400. A plurality of satellites 420 are in orbit about the earth 124. The orbit of each satellite 420 is not necessarily synchronous with the orbits of other satellites 420 and, in fact, is likely asynchronous. A GPS receiver 440 is shown receiving spread spectrum GPS satellite signals 460 from the various satellites 420.

The spread spectrum signals 460, continuously transmitted from each satellite 420, utilize a highly accurate frequency standard accomplished with an extremely accurate atomic clock. Each satellite 420, as part of its data signal transmission 460, transmits a data stream indicative of that particular satellite 420. It is appreciated by those skilled in the relevant art that the GPS receiver device 440 generally acquires spread spectrum GPS satellite signals 460 from at least three satellites 420 for the GPS receiver device 440 to calculate its two-dimensional position by triangulation. Acquisition of an additional signal, resulting in signals 460 from a total of four satellites 420, permits the GPS receiver device 440 to calculate its three-dimensional position in a known manner.

Figure 9:
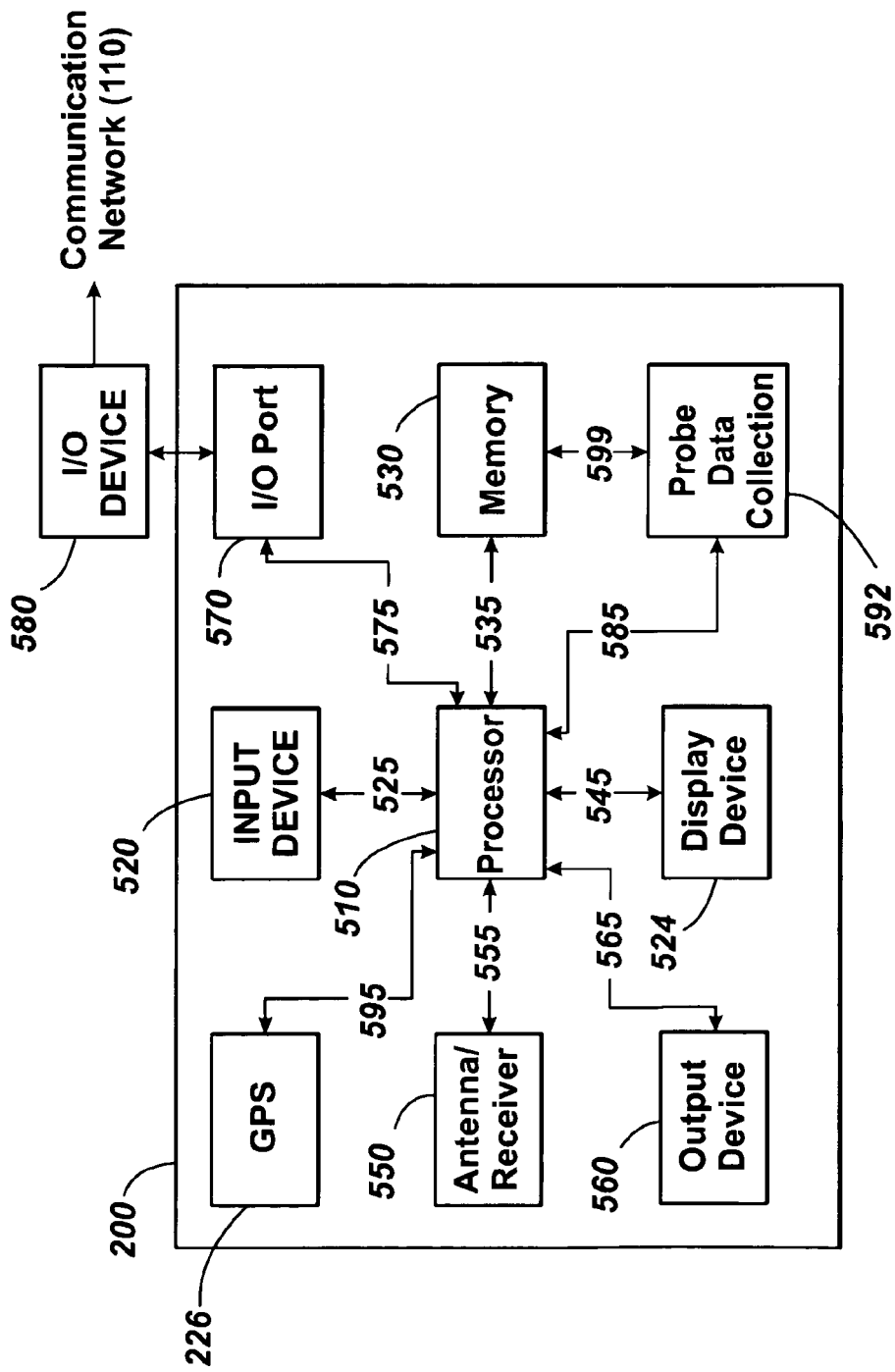
FIG. 9 is a schematic illustration of electronic components arranged to provide a navigation device.

FIG. 9 is an illustrative representation of electronic components of a navigation device 200 according to an example embodiment of the present disclosure, in block component format. It should be noted that the block diagram of the navigation device 200 is not inclusive of all components of the navigation device, but is only representative of many example components.

The navigation device 200 is located within a housing (not shown). The housing includes a processor 510 connected to an input device 520 and a display screen 540. The input device 520 can include a keyboard device, voice input device, touch panel and/or any other known input device utilised to input information; and the display screen 540 can include any type of display screen such as an LCD display, for example. In an example arrangement, the input device 520 and display screen 540 are integrated into an integrated input and display device, including a touchpad or touch screen input so that a user need only touch a portion of the display screen 540 to select one of a plurality of display choices or to activate one of a plurality of virtual buttons.

The navigation device may include an output device 560, for example an audible output device (e.g. a loudspeaker). As output device 560 can produce audible information for a user of the navigation device 200, it is should equally be understood that input device 540 can include a microphone and software for receiving input voice commands as well.

In the navigation device 200, processor 510 is operatively connected to and set to receive input information from input device 520 via a connection 525, and operatively connected to at least one of display screen 540 and output device 560, via output connections 545, to output information thereto. Further, the processor 510 is operably coupled to a memory resource 530 via connection 535 and is further adapted to receive/send information from/to input/output (I/O) ports 570 via connection 575, wherein the I/O port 570 is connectible to an I/O device 580 external to the navigation device 200.

The memory resource 530 may include, for example, a volatile memory, such as a Random Access Memory (RAM)

and a non-volatile memory, for example a digital memory, such as a flash memory. The external I/O device 580 may include, but is not limited to an external listening device such as an earpiece for example. The connection to I/O device 580 can further be a wired or wireless connection to any other external device such as a car stereo unit for hands-free operation and/or for voice activated operation for example, for connection to an ear piece or head phones, and/or for connection to a mobile phone for example, wherein the mobile phone connection may be used to establish a data connection between the navigation device 200 and the internet or any other network for example, and/or to establish a connection to server 202 via e.g., communication network 110, the internet or some other network.

FIG. 9 further illustrates an operative connection between the processor 510 and an antenna/receiver 550 via connection 555, wherein the antenna/receiver 550 can be a GPS antenna/receiver for example. It will be understood that the antenna and receiver designated by reference numeral 550 are combined schematically for illustration, but that the antenna and receiver may be separately located components, and that the antenna may be a GPS patch antenna or helical antenna for example.

The navigation device 200 may use embedded GPS 226 facility to determine current data, e.g., position, speed, heading and slope, associated with the navigation device 200. This data, in combination with a local geographic database stored in, for example, memory 530, may be used to provide a user of the navigation device 200 with information associated with their current travel conditions, e.g., location in relation to a stored map in the local geographic database, estimated time of arrival given a destination, location of proximate points of interest and information thereof. The probe data collection facility 592 may collect said information from the navigation device 200 and local geographic database over a period of time, and either store the information for later transmission, or transmit the information real-time through the navigation device's 200 communication system, for example, via I/O device 580 and communication network 110.

Further, it will be understood by one of ordinary skill in the art that the electronic components shown in FIG. 9 are powered by power sources (not shown) in a conventional manner. As will be understood by one of ordinary skill in the art, different configurations of the components shown in FIG. 9 are considered to be within the scope of the present application. For example, the components shown in FIG. 9 may be in communication with one another via wired and/or wireless connections and the like. Thus, the scope of the navigation device 200 of the present application includes a portable or handheld navigation device 200.

In addition, the portable or handheld navigation device 200 of FIG. 9 can be connected or "docked" in a known manner to a vehicle such as a bicycle, a motorbike, a car or a boat for example. Such a navigation device 200 is then removable from the docked location for portable or handheld navigation use.

As indicated above in FIG. 9, a navigation device 200 includes a processor 510, an input device 520, and a display screen 540. The input device 520 and display screen 540 may be integrated into an integrated input and display device to enable both input of information (via direct input, menu selection, etc.) and display of information through a touch panel screen, for example. Such a screen may be a touch input LCD screen, for example, as is well known to those of ordinary skill in the art. Further, the navigation device 200 can also include any additional input device 520 and/or any additional output device 560, such as audio input/output devices for example.

Figure 10A:
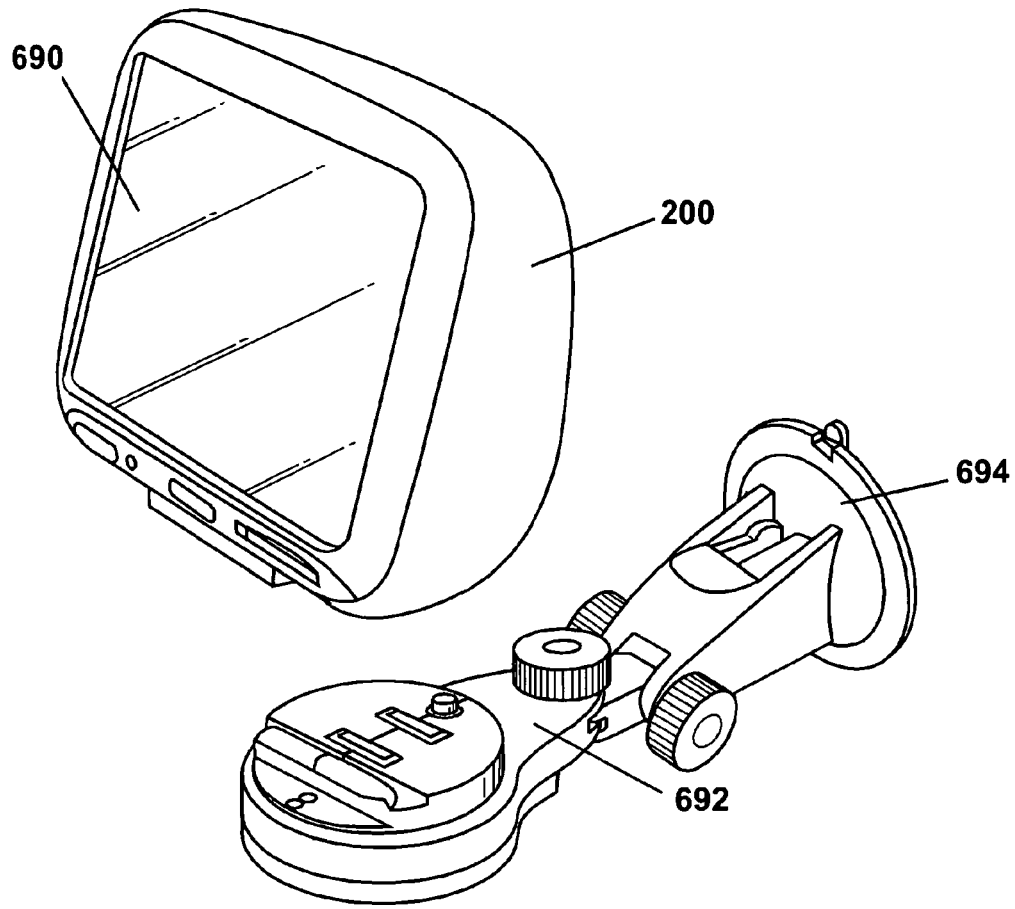
FIGS. 10A and 10B are illustrative perspective views of a navigation device.
Figure 10B:
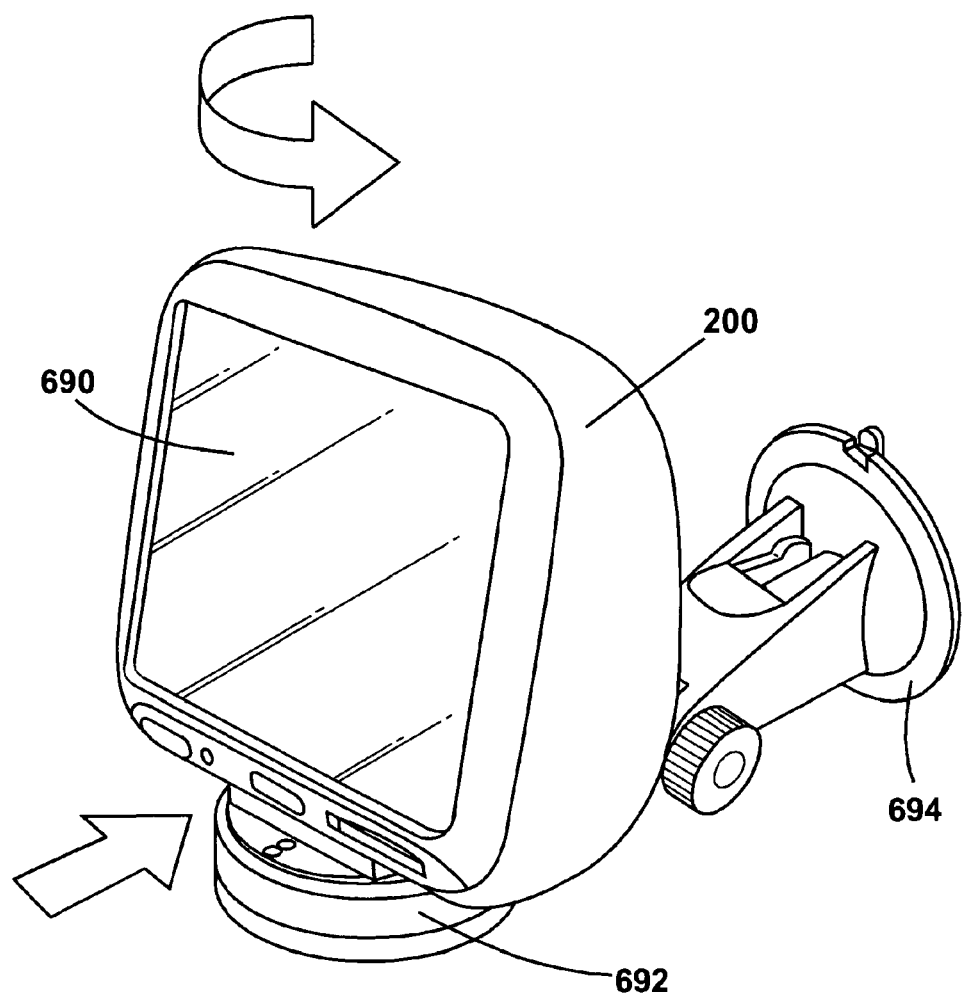

FIGS. 10A and 10B are perspective views of a navigation device 200. As shown in FIG. 10A, the navigation device 200 may be a unit that includes an integrated input and display device 690 (a touch panel screen for example) and the other components of FIG. 9 (including but not limited to internal GPS receiver 550, microprocessor 510, a power supply, memory systems 530, etc.).

The navigation device 200 may sit on an arm 692, which itself may be secured to a vehicle dashboard/window/etc. using a suction cup 694. This arm 692 is one example of a docking station to which the navigation device 200 can be docked.

As shown in FIG. 10B, the navigation device 200 can be docked or otherwise connected to an arm 692 of the docking station by snap connecting the navigation device 200 to the arm 692 for example. The navigation device 200 may then be rotatable on the arm 692, as shown by the arrow of FIG. 10B. To release the connection between the navigation device 200 and the docking station, a button on the navigation device 200 may be pressed, for example. Other equally suitable arrangements for coupling and decoupling the navigation device to a docking station are well known to persons of ordinary skill in the art.

Referring now to FIGS. 11a to 11i there is depicted a series of screenshots from a navigation device 200. This navigation device 200 has a touch screen interface for displaying information to a user and for accepting input to the device from the user. The screenshots show an illustrative example embodiment of a destination location input process for a user whose home location has been set to the offices in The Hague of the European Patent Office, and who wishes to navigate to a street address in Amsterdam, The Netherlands for which they know the street name and building number.

Figure 11A:
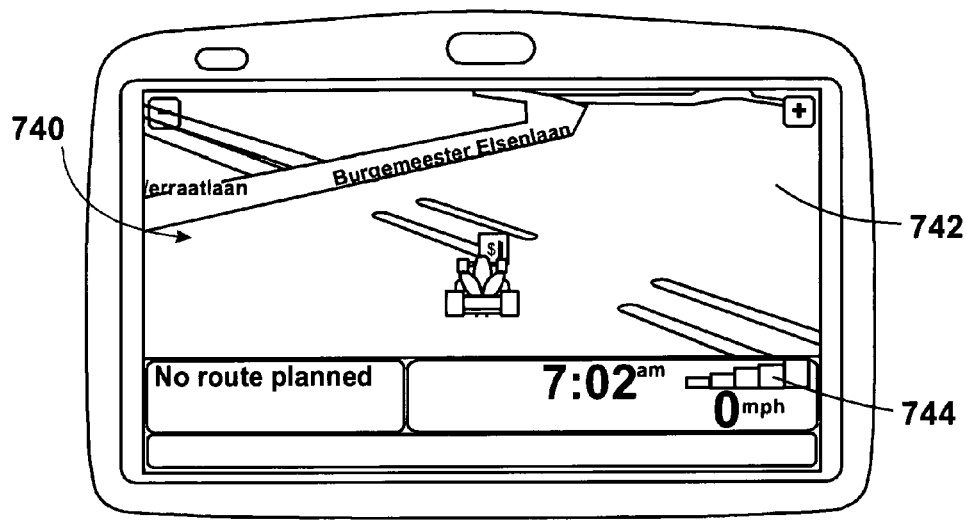
FIGS. 11A to 11I are illustrative screenshots from a navigation device for a destination input process.

When this user switches on their navigation device 200, the device acquires a GPS fix and calculates (in a known manner) the current location of the navigation device 200. The user is then presented, as shown in FIG. 11a, with a display 740 showing in pseudo three-dimensions the local environment 742 in which the navigation device 200 is determined to be located, and in a region 744 of the display 740 below the local environment a series of control and status messages.

Figure 11B:
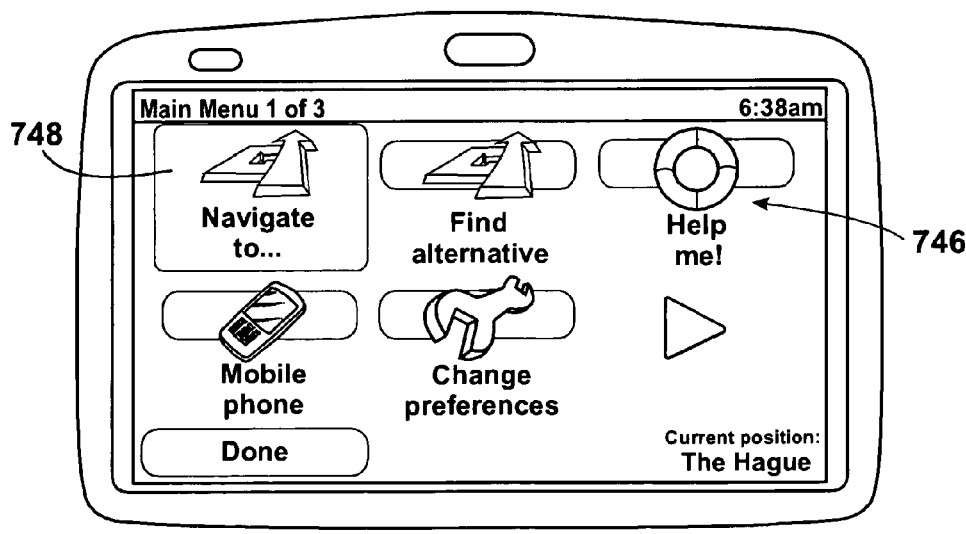

By touching the display of the local environment 742, the navigation device 200 switches to display (as shown in FIG. 11b) a series of virtual buttons 746 by means of which a user can, inter alia, input a destination that they wish to navigate to.

Figure 11C:
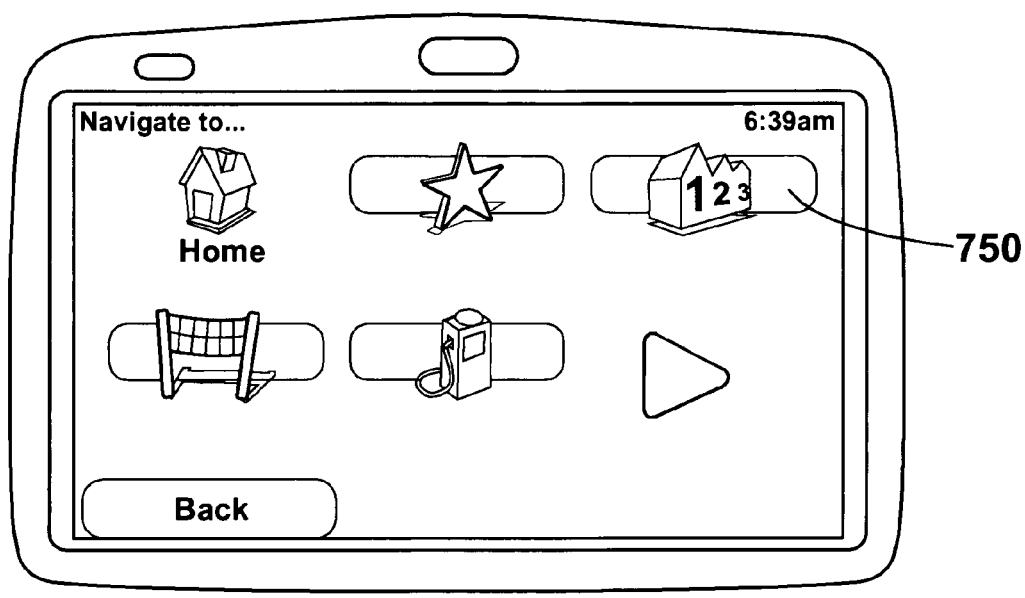

By touching the "navigate to" virtual button 748, the navigation device 200 switches to display (as shown in FIG. 11c) a plurality of virtual buttons that are each associated with a different category of selectable destinations. In this instance, the display shows a "home" button that if pressed would set the destination to the stored home location. However, in this instance as the user is already at their home location (namely the EPO's offices in the Hague) selecting this option would not cause a route to be generated. The "favourite" button, if pressed, reveals a list of destinations that the user has previously stored in the navigation device 200 and if one of these destinations is then selected the destination for the route to be calculated is set to the selected previously stored destination. The "recent destination" button, if pressed, reveals a list of selectable destinations held in the memory of the navigation device 200 and to which the user has recently navigated. Selection of one of the destinations populating this list would set the destination location for this route to the selected (previously visited) location. The "point of interest" button, if pressed, reveals a number of options by which a user can opt to navigate to any of a plurality of locations, such as cash machines, petrol stations or tourist attractions for example, that have been pre-stored in the device as locations that a user of the device might want to navigate to. The "arrow" shaped virtual button opens a new menu of additional options, and the "address" button 750 commences a process by which the user can input the street address of the destination that they wish to navigate to.

Figure 11D:
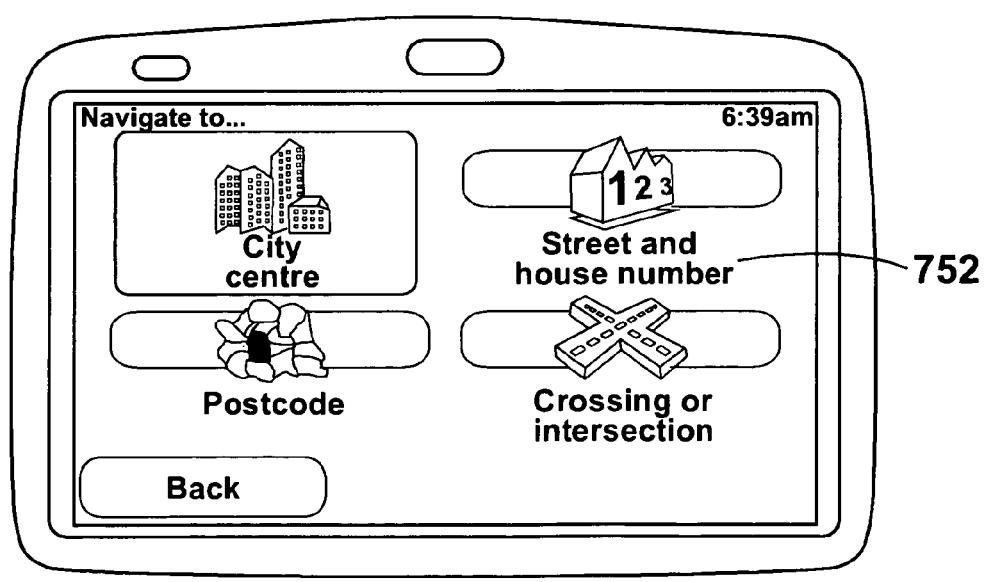

Since the user, in this example, knows the street address of the destination that they wish to navigate to, it is assumed that this "address" button is operated (by touching the button displayed on the touch screen), whereupon (as shown in FIG. 11*d*) the user is presented with a series of address input options—in particular for address input by "city centre", by "postcode", by "crossing or intersection" (for example a junction of two roads) and by "street and house number".

Figure 11E:

In this example the user knows the street address and house number of the destination and hence selects the "street and house number" virtual button 752 whereupon the user is then presented, as shown in FIG. 11*e*, a prompt 754 to enter the name of the city that they wish to navigate to, a flag button 756 by which the user can select the country in which the desired city is located, and a virtual keyboard 758 that may be operated by the user, if necessary, to input the name of the destination city. In this instance the user has previously navigated to locations in Rijswijk and Amsterdam, and the PND therefore additionally provides the user with a list 760 of selectable cites.

Figure 11F:
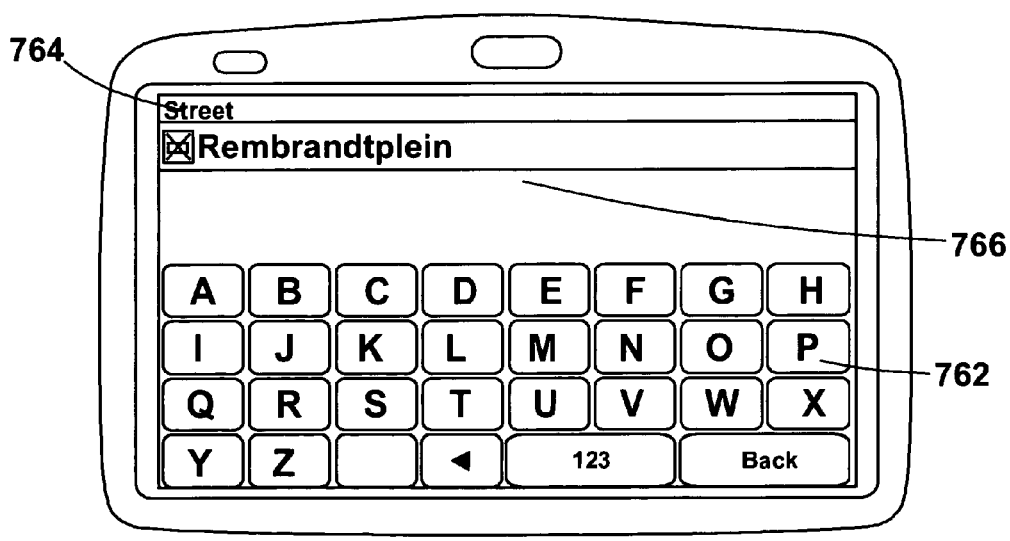

The user in this instance wishes to navigate to Amsterdam, and on selection of Amsterdam from the list 760 the navigation device 200 displays, as shown in FIG. 11*f*, a virtual keyboard 762 by means of which a user can input street names, a prompt 764 for entry of a street name 764 and, in this instance, as the user has previously navigated to a street in Amsterdam, a list 766 of selectable streets in Amsterdam.

In this example the user wishes to return to the street, Rembrandtplein, that they have previously visited and so selects Rembrandtplein from the displayed list 766.

Figure 11G:
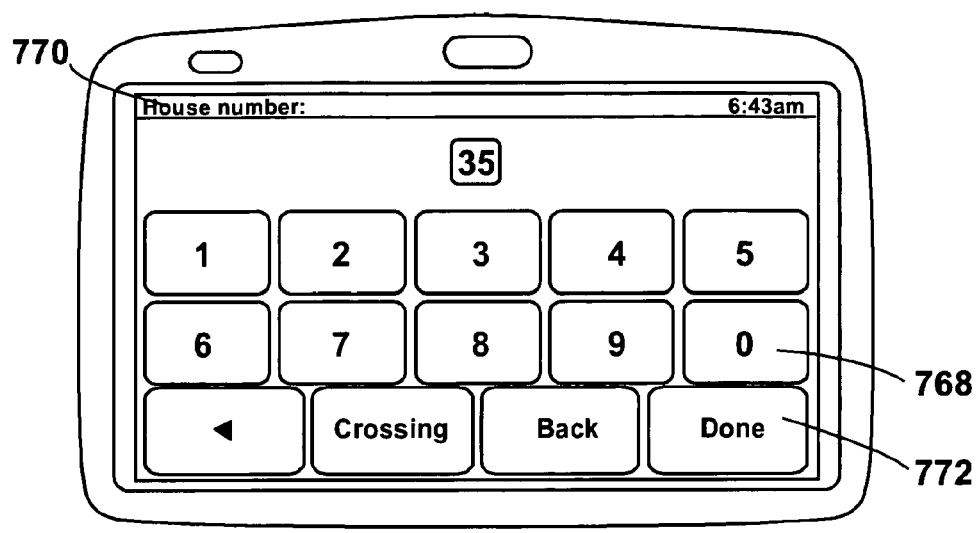

Once a street has been selected, the navigation device 200 then displays a smaller virtual keypad 768 and prompts the user, via prompt 770, to enter the number of the house in the selected street and city that they wish to navigate to. If the user has previously navigated to a house number in this street, then that number (as shown in FIG. 11*g*) is initially shown. If, as in this instance, the user wishes to navigate to No. 35, Rembrandtplein once again, then the user need only touch a "done" virtual button 772 displayed at the bottom right hand corner of the display. If the user should wish to navigate to a different house number in Rembrandtplein, then all they need do is operate the keypad 768 to input the appropriate house number.

Figure 11H:
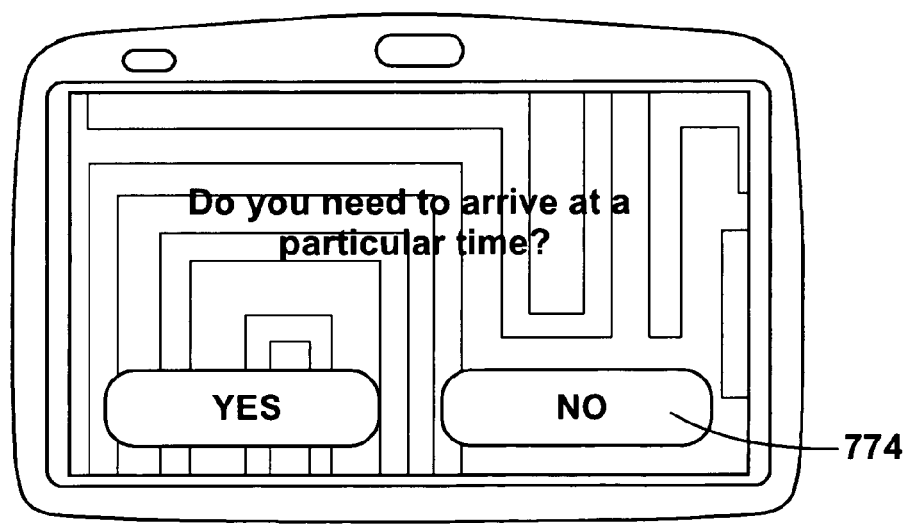

Once the house number has been input, the user is asked in FIG. 11*h*, whether they wish to arrive at a particular time. If the user should push the "yes" button, then functionality is invoked that estimates the time required to travel to the destination and advises the user when they should leave (or if they are running late, should have left) their current location in order to arrive at their destination on time. In this instance the user is not concerned about arriving at a particular time and hence selects the "no" virtual button.

Figure 11I:
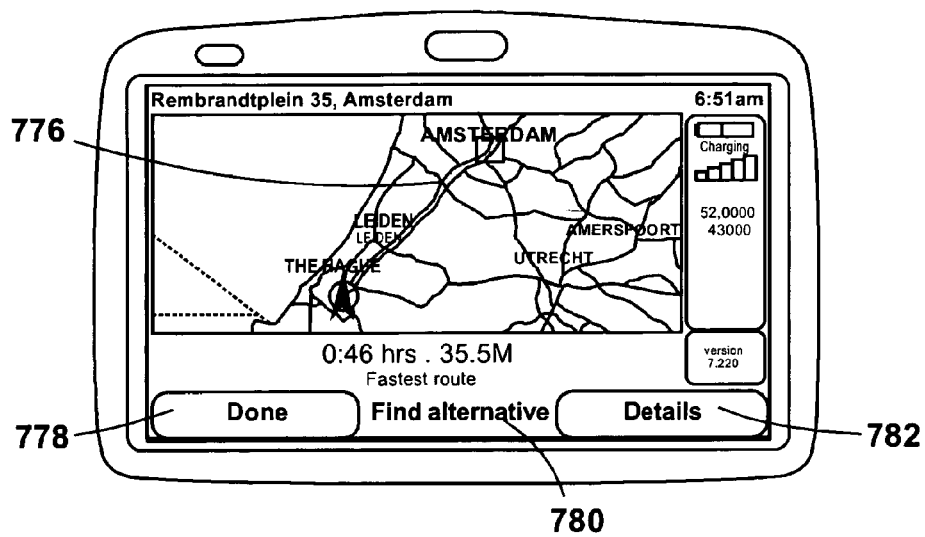

Selecting the "no" button 774 causes the navigation device 200 to calculate a route between the current location and the selected destination and to display that route 776, as shown in FIG. 11*i*, on a relatively low magnification map that shows the entire route. The user provided with a "done" virtual button 778 which they can press to indicate that they are happy with the calculated route, a "find alternative" button 780 that the user can press to cause the navigation device 200 to calculate another route to the selected destination, and a "details" button 782 that a user can press to reveal selectable options for the display of more detailed information concerning the currently displayed route 776.

Figure 12:
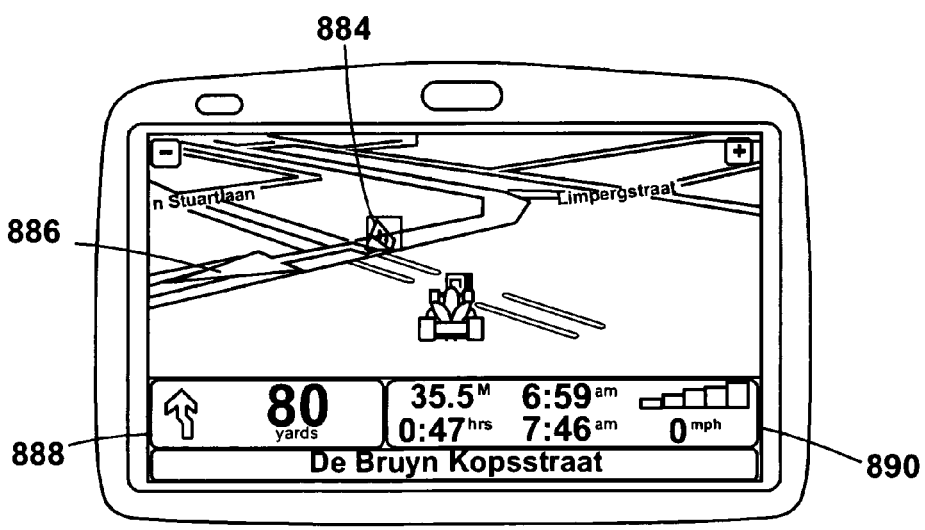
FIG. 12 is an illustrative screenshot from a navigation device depicting a start location for an illustrative calculated route.

In this instance it is assumed that the user is happy with the displayed route, and once the "done" button 778 has been pressed the user is presented, as shown in FIG. 12, with a pseudo three-dimensional view of the current, start, location for the navigation device 200. The display depicted in FIG. 12 is similar to that shown in FIG. 11*a* except that the displayed local environment 742 now includes a start location flag 884 and a waypoint indicator 886 indicating the next manoeuvre (in this instance, a left hand turn). The lower part of the display has also changed and now displays the name of the street in which the navigation device 200 is currently located, an icon 888 indicating the distance to and type of the next manoeuvre (from the current location of the navigation device 200), and a dynamic display 890 of the distance and time to the selected destination.

The user then commences their journey and the navigation device 200 guides the user, in a known manner, by updating the map in accordance with determined changes in navigation device 200 location, and by providing the user with visual and, optionally, audible navigation instructions.

Alternative embodiments of the invention can be implemented as a computer program product for use with a computer system, the computer program product being, for example, a series of computer instructions or program segments stored on a tangible data recording medium (computer readable medium), such as a diskette, CD-ROM, ROM, or fixed disk, or embodied in a computer data signal, the signal being transmitted over a tangible medium or a wireless medium, for example, microwave or infrared. The series of computer instructions or program segments can constitute all or part of the functionality of the method of embodiments described above, and can also be stored in any memory device, volatile or non-volatile, such as semiconductor, magnetic, optical or other memory device.

It will also be appreciated that whilst various aspects and embodiments of the present disclosure have heretofore been described, the scope of the present disclosure is not limited to the particular arrangements set out herein and instead extends to encompass all arrangements, and modifications and alterations thereto, which fall within the scope of the appended claims.

For example, whilst embodiments described in the foregoing detailed description refer to GPS, it should be noted that the navigation device 200 may utilise any kind of position sensing technology as an alternative to (or indeed in addition to) GPS. For example the navigation device may utilise using other global navigation satellite systems such as the European Galileo system. Equally, it is not limited to satellite based but could readily function using ground based beacons or any other kind of system that enables the device to determine its geographic location.

It will also be well understood by persons of ordinary skill in the art that whilst the example embodiment implements certain functionality by means of software, that functionality could equally be implemented solely in hardware (for example by way of one or more ASICs (application specific integrated circuit)) or indeed by a mix of hardware and software. As such, the scope of the present disclosure should not be interpreted as being limited only to being implemented in software.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether or not that particular combination has been specifically enumerated in the accompanying claims at this time.

The invention claimed is:

1. A method of detecting errors in road characteristics defined by one or more attributes associated with a transportation network database, comprising:
in a server computer, performing operations for:
collecting a plurality of sequential location measurements from each of a plurality of probes traversing between two end points;
fitting trace segments having at least one of a curved and linear shape between the plurality of sequential location measurements collected from each of the plurality of probes to form a probe trace for each of the of the plurality of probes;
comparing a position of at least one of the plurality of probe traces with a position of a calculated path between the two end points, where the calculated path is formed from a plurality of linked transportation network segments, each of the linked transportation segments having at least one of a curved or linear shape, where the calculated path follows the road characteristics defined by the one or more attributes associated with the one or more of the linked transportation segments; and
identifying a potential error in the one or more attributes if a number of the plurality of probe traces deviating in position from the calculated path is greater than a deviation threshold.

2. The method of claim 1, wherein the fitting fits the trace segments to have at least one of a curved and linear shape based on a geometry of a group of the sequential location measurements, where at least the curved trace segment is represented by a function.

3. The method of claim 1, wherein the comparing further includes, measuring a distance between the calculated path and at least one of the plurality of probe traces at one or more intervals between the two end points of the calculated path.

4. The method of claim 3, wherein the measuring measures the distance at the one or more intervals by measuring the distance at which a perpendicular bisector at the one or more intervals intersects at least one of the plurality of probe traces.

5. The method of claim 4, wherein,
the comparing determines a number of the measured distances that is greater than a distance threshold for each of the one or more intervals, and
the identifying identifies the potential error in the one or more attributes associated with one or more of the linked transportation segments corresponding to the one or more intervals if the number of measured distances at the corresponding one or more intervals is greater than the deviation threshold.

6. The method of claim 5, wherein the identifying further identifies potential errors in one or more attributes associated with one or more linked transportation segments in the network database separate from the calculated path that correspond to a position of the deviating probe traces at the one or more intervals if the number of measured distances at the one or more intervals is greater than the deviation threshold.

7. The method of claim 5, further comprising:
updating the one or more attributes associated with one or more of the linked transportation segments corresponding to the one or more intervals by changing a value of the one or more attributes to indicate between one of allowed or prohibited road characteristics if the identifying identifies the potential error in the one or more attributes associated with one or more of the linked transportation segments.

8. The method of claim 1, wherein the one or more attributes are related to at least one of geographic indicators and traffic controls,
wherein geographic indicators include at least one of presence of road lanes, number of road lanes, type of road lanes, blocked passages, grade-separated crossings, elevation, and road gradients,
wherein traffic controls include at least one of legal speed limits, stop signs, yields, school zones, turn restrictions, lane change capability, or direction of road lanes,
wherein a value of the one or more attributes are configured to be variable according to a time of day.

9. The method of claim 1, wherein the collecting collects the sequential location measurements based on probe trace data collected at least one of automatically at different time intervals and manually by prompting a user for input.

10. A non-transitory computer readable medium encoded with computer executable instructions, which when executed on a computer, cause the computer to perform the method of claim 1.

11. A server for detecting errors in road characteristics defined by one or more attributes associated with a transportation network database, comprising:
a receiver configured to collect a plurality of sequential location measurements from each of a plurality of probes traversing between two end points;
a processor configured to fit trace segments having at least one of a curved and linear shape between the plurality of sequential location measurements collected from each of the of the plurality of probes to form a probe trace for each of the of the plurality of probes; and
a memory configured to store a plurality of linked transportation network segments, each of the linked transportation segments having at least one of a curved or linear shape, wherein
the processor is further configured to compare a position of at least one of the plurality of probe traces with a position of a calculated path between the two end points stored, where the calculated path is formed from the plurality of linked transportation network segments and the calculated path follows the road characteristics defined by the one or more attributes associated with the one or more of the linked transportation segments, and
the processor is configured to identify a potential error in the one or more attributes if a number of the plurality of probe traces deviating in position from the calculated path is greater than a deviation threshold.

12. The server of claim 11, wherein the processor is configured to fit the trace segments to have at least one of a curved and linear shape based on a geometry of a group of the sequential location measurements, where at least the curved trace segment is represented by a function.

13. The server of claim 11, wherein the processor is further configured to measure a distance between the calculated path and at least one of the plurality of probe traces at one or more intervals between the two end points of the calculated path.

14. The server of claim 13, wherein the processor is further configured to measure the distance at the one or more intervals by measuring the distance at which a perpendicular bisector at the one or more intervals intersects at least one of the plurality of probe traces.

15. The server of claim 13, wherein, the processor is further configured to,
   determine a number of the measured distances that is greater than a distance threshold for each of the one or more intervals, and
   identify the potential error in the one or more attributes associated with one or more of the linked transportation segments corresponding to the one or more intervals if the number of measured distances at the corresponding one or more intervals is greater than the deviation threshold.

16. The server of claim 15, wherein the processor is further configured to identify potential errors in one or more attributes associated with one or more linked transportation segments in the network database separate from the calculated path that correspond to a position of the deviating probe traces at the one or more intervals if the number of measured distances at the one or more intervals is greater than the deviation threshold.

17. The server of claim 15, wherein the processor is further configured to update the one or more attributes stored in the memory associated with one or more of the linked transportation segments corresponding to the one or more intervals by changing a value of the one or more attributes to indicate between one of allowed and prohibited road characteristics if the identifying identifies the potential error in the one or more attributes associated with one or more of the linked transportation segments.

18. A method of detecting errors in attribution associated with transportation network segments that are part of a digital transportation database, comprising:
   in a server computer, performing operations for:
      collecting a plurality of sequential location measurements from each of a plurality of probes traversing between two end points;
      calculating an optimal route between the two endpoints which traverses linked transportation network segments and adheres to traffic control attributes associated with the traversed linked transportation segments;
      for each of the probes traversing between the two end points, comparing a position of at least one of the sequential location measurements with a nearest position along the optimal route; and
      identifying a potential error in the one or more traffic control attributes if a number of the plurality of probe traces which have at least one sequential location measurement deviating in position from the calculated path is greater than a deviation threshold.

* * * * *